US012800437B2

(12) United States Patent
Ramos Gurjao et al.

(10) Patent No.: US 12,800,437 B2
(45) Date of Patent: Nov. 17, 2026

(54) MONITORING ENGINE OIL LEVEL AND QUALITY FOR WELL SYSTEMS

(71) Applicant: Halliburton Energy Services, Inc., Houston, TX (US)

(72) Inventors: Kildare George Ramos Gurjao, Houston, TX (US); David Rand Hill, Zanesville, OH (US); Shahab Jamali Ghare Tape, Houston, TX (US); Baidurja Ray, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 126 days.

(21) Appl. No.: 18/807,527

(22) Filed: Aug. 16, 2024

(65) Prior Publication Data

US 2026/0049898 A1 Feb. 19, 2026

(51) Int. Cl.

| | |
|---|---|
| ***G01M 15/05*** | (2006.01) |
| ***E21B 43/26*** | (2006.01) |
| ***E21B 44/00*** | (2006.01) |
| ***G08B 21/18*** | (2006.01) |

(52) U.S. Cl.

CPC ............. *G01M 15/05* (2013.01); *E21B 43/26* (2013.01); *E21B 44/00* (2013.01); *G08B 21/182* (2013.01)

(58) Field of Classification Search

CPC ........ G01M 15/05; E21B 43/26; E21B 44/00; G08B 21/182

See application file for complete search history.

(56) References Cited

U.S. PATENT DOCUMENTS

| | | | | |
|---|---|---|---|---|
| 4,059,087 A | | 11/1977 | Tanigami et al. | |
| 4,584,907 A | | 4/1986 | Niwa et al. | |
| 4,666,019 A | | 5/1987 | Schaller | |
| 5,121,599 A | | 6/1992 | Snyder et al. | |
| 5,274,335 A | * | 12/1993 | Wang ................. | G01N 33/2888 73/61.43 |
| 5,462,679 A | | 10/1995 | Verdegan et al. | |
| 5,858,224 A | | 1/1999 | Schwandt et al. | |

(Continued)

FOREIGN PATENT DOCUMENTS

JP 2012184701 9/2012

OTHER PUBLICATIONS

"PCT Application No. PCT/US2024/044914 International Search Report and Written Opinion", May 19, 2025, 10 pages.

(Continued)

*Primary Examiner* — Grant Moubry

(74) *Attorney, Agent, or Firm* — DeLizio, Peacock, Lewin and Guerra, LLP

(57) ABSTRACT

Systems, methods, and apparatus, including computer programs encoded on computer-readable media, for monitoring engine oil of a well system. Engine oil differential pressure (EODP) measurements data may be obtained from an engine of the well system. At least one of an EODP oscillation indicator, EODP zero information, or EODP slope information may be determined based on the EODP measurement data. Engine oil pressure (EOP) measurement data may also be obtained from the engine of the well system. At least one of engine oil level or engine oil quality may be determined based on at least one of the EODP oscillation indicator, the EODP zero information, the EODP slope information, or the EOP measurement data.

24 Claims, 13 Drawing Sheets

(56) References Cited

U.S. PATENT DOCUMENTS

| | | | | |
|---|---|---|---|---|
| 5,968,371 | A | 10/1999 | Verdegan et al. | |
| 6,098,605 | A | 8/2000 | Brooks | |
| 6,535,001 | B1 | 3/2003 | Wang | |
| 6,553,812 | B2 * | 4/2003 | Park | G01N 33/2888 73/54.01 |
| 6,718,819 | B2 * | 4/2004 | Schoess | B01D 29/60 73/61.61 |
| 10,436,766 | B1 | 10/2019 | Bayyouk et al. | |
| 10,697,337 | B2 | 6/2020 | Pursifull | |
| 2003/0226809 | A1 | 12/2003 | Zagone et al. | |
| 2007/0246262 | A1 | 10/2007 | Brookover | |
| 2012/0316751 | A1 | 12/2012 | Eastwood et al. | |
| 2016/0123232 | A1 | 5/2016 | Wright et al. | |
| 2021/0140351 | A1 * | 5/2021 | Green | G01M 15/12 |
| 2022/0364453 | A1 | 11/2022 | Chang et al. | |

OTHER PUBLICATIONS

Schmitigal, et al., "Evaluation of Sensors for On-Board Diesel Oil Condition Monitoring of U.S. Army Ground Equipment", U.S. Army RDECOM-TARDEC Presented at SAE 2005 World Congress, Detroit, MI, Jan. 4, 2005, 6 pages.

* cited by examiner

1000

| | M1 | M2 | M3 | M4 |
|---|---|---|---|---|
| M1 | Moderate oil quality; Severe oil level | Severe oil quality; Severe oil level | Severe oil quality; Severe oil level | Moderate oil quality; Severe oil level |
| M2 | | Severe oil quality | Severe oil quality | Severe oil quality; Severe oil level |
| M3 | | | Severe oil quality | Severe oil quality; Severe oil level |
| M4 | | | | Severe oil level |

FIG. 10

MONITORING ENGINE OIL LEVEL AND QUALITY FOR WELL SYSTEMS

TECHNICAL FIELD

The present invention relates generally to oil and gas systems and services, and more specifically to monitoring engine oil level and quality for well systems.

BACKGROUND

The oil and gas services industry uses various types of well equipment and tools in well systems at well sites. Internal combustion engines may be used by well systems at well sites. For example, the hydraulic fracturing equipment of fracturing well systems may use internal combustion engines. Other types of well systems may also use internal combustion engines. A well operator typically monitors the oil level and the oil quality of the engine oil that is used in the internal combustion engines using costly and specialized sensors that measure the oil level and oil quality. Monitoring the oil level and oil quality of the engine oil can extend the useful life of the engine, and prevent engine failures, reduce major repairs, and prevent engine ventilations. Engine ventilation is a catastrophic explosion of an engine, such as an engine of a fracturing pumping unit, which can be dangerous to well site personnel and can result in high repair and replacement costs to the well operator. One of the primary causes of engine failures, engine ventilation, or engine damage is lack of lubrication from the engine oil. Internal combustion engines have multiple parts that are in constant motion, and the addition of lubricant forms a film that separates these parts in order to reduce friction and wear. Therefore, monitoring of oil levels and oil quality is paramount to extending the useful life of the engines and preventing or reducing engine failures.

BRIEF DESCRIPTION OF THE DRAWINGS

FIG. 10 depicts an example chart of various combinations of implementing proxy models for monitoring engine oil level and engine oil quality, according to some implementations.

DESCRIPTION

The description that follows includes example systems, methods, techniques, and program flows that describe aspects of the disclosure. However, it is understood that this disclosure may be practiced without these specific details. For instance, this disclosure refers to certain well systems, devices, or tools in illustrative examples. Aspects of this disclosure can be instead applied to other types of well systems, devices, and tools. In other instances, well-known instruction instances, protocols, structures, and techniques have not been shown in detail to avoid confusion.

Figure 1:
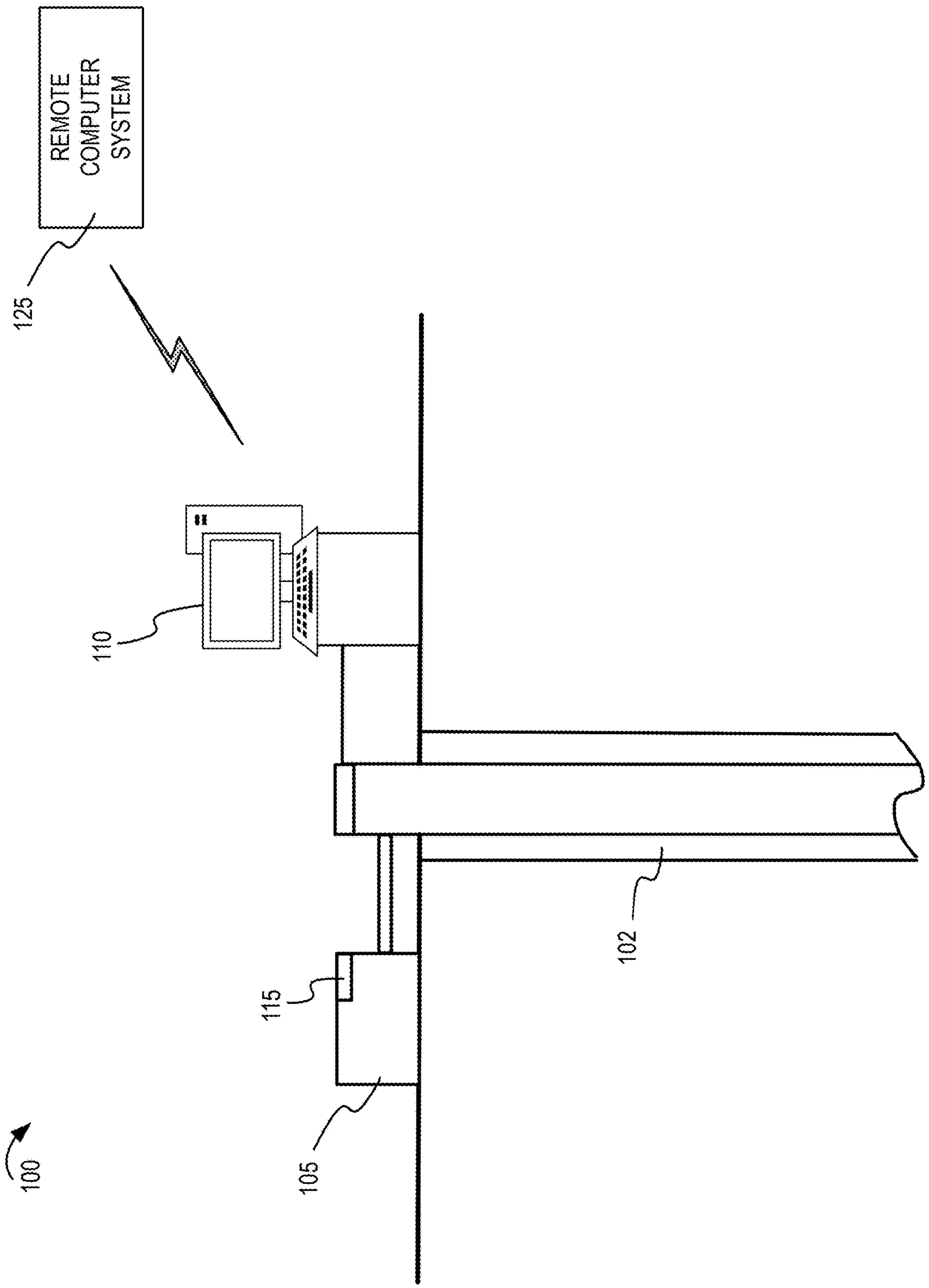
FIG. 1 depicts a schematic diagram of an example well system configured to monitor oil level and oil quality of engine oil, according to some implementations.

FIG. 1 depicts a schematic diagram of an example well system 100 configured to monitor oil level and oil quality of engine oil, according to some implementations. In some implementations, the well system 100 may include a wellbore 102, an engine 105, a computer system 110, and a remote computer system 125. It is noted that the well system 100 may include additional devices, tools and other components that are not shown for simplicity. For example, the well system 100 may be a fracturing well system that uses one or more engines in fracturing equipment (e.g., a fracturing pump unit) to perform the fracturing operations, as further described below in FIG. 13. It is noted however that the well system 100 may be other types of well systems that use internal combustion engines in other types of well equipment. In some implementations, the well system 100 may perform fracturing operations, such as hydraulic fracturing operations, for extracting reservoir fluid (e.g., hydrocarbons such as oil and gas) from the subsurface formation. During a hydraulic fracturing operations of the well system 100, one or more fracturing pumps may pump fracturing fluid or fracturing treatments, with or without sand, into the subsurface formation via perforations in the wellbore 102 to hydraulically fracture the rock of the subsurface formation, such that the reservoir fluid may flow into the wellbore 102 for extraction. For example, in FIG. 1, the engine 105 may be an internal combustion engine that is part of a fracturing pump (not shown). It is noted, however, that in other implementations the engine 105 may be part of other types of well equipment of the well system 100. In some implementations, the engine 105 may include sensors 115 to obtain engine oil differential pressure (EODP) measurements, engine oil pressure (EOP) measurements, and revolutions per minute (RPM) measurements for the engine speed. As further described below, the sensors 115 may provide the measurement data to the computer system 110 and/or the remote computer system 125 for further processing. The computer system 110 may be a local or edge computer system at the local well site. The remote computer system 125 may be a computer system located remotely, such as a server computer system at a monitoring facility or one or more cloud computer systems or servers of a cloud computer network.

Figure 12:
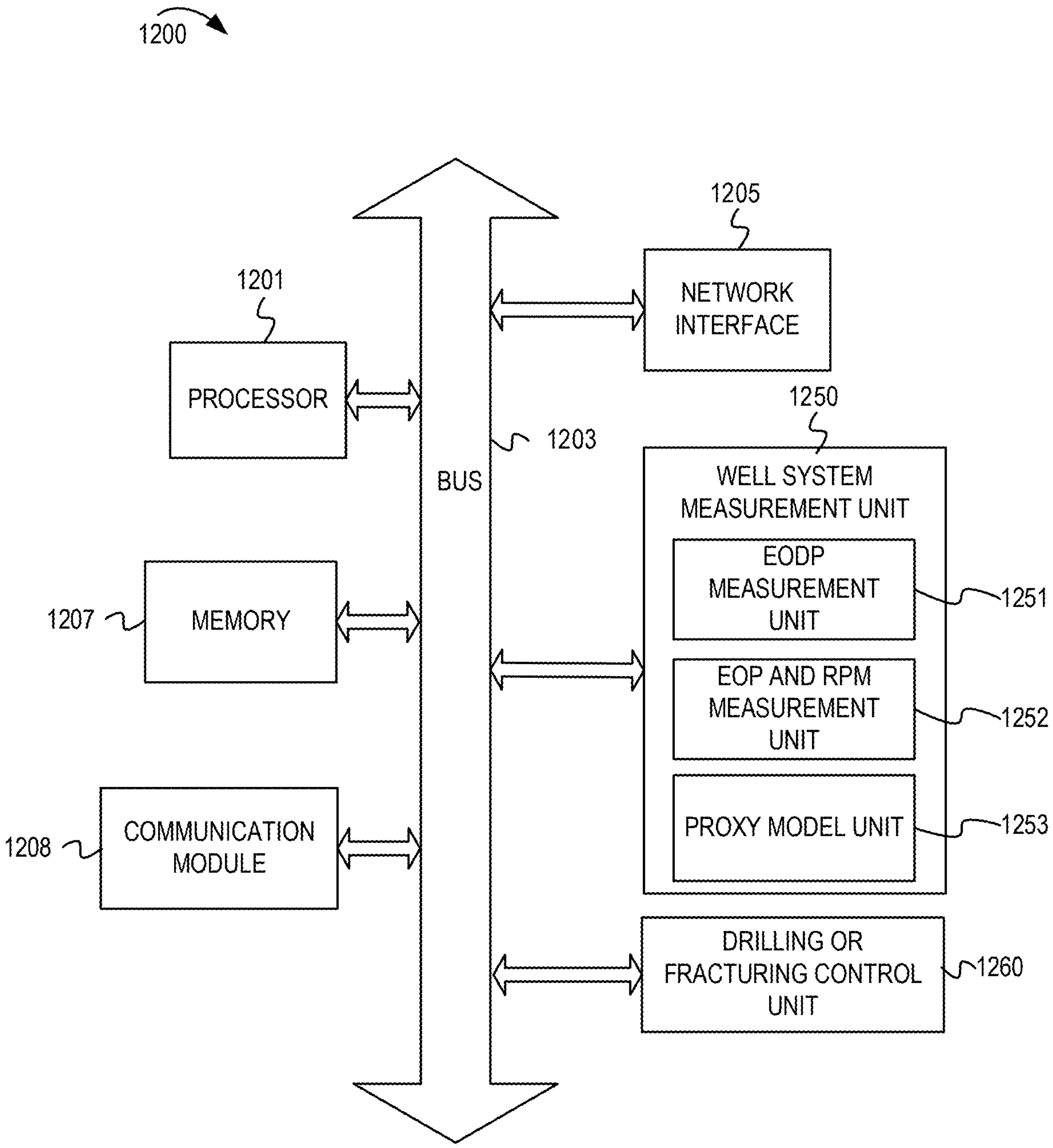
FIG. 12 depicts an example computer system that can be implemented in surface equipment of a well system or in a remote computer network for monitoring oil level and oil quality of engine oil used by an engine of a well system, according to some implementations.

In some implementations, the computer system 110 may be communicatively coupled to the well equipment (such as the engine 105 and sensors 115), well tools, and other parts of the well system 100. For example, the computer system 110 may be communicatively coupled via a wired connection and/or a wireless connection. For example, the engine 105 and/or the sensors 115 may be internet of things (IoT) devices that communicate with the computer system 110 using wireless communications. An example of the computer system 110 is depicted in FIG. 12, which is further described below. In some implementations, the computer system 110 may obtain the measurement data (e.g., EODP, EOP and/or RPM) from the sensors 115, may process the measurement data, and may implement and run one or more proxy models using the measurement data to monitor the oil level and oil quality of the engine oil used by the engine 105, as further described below. In some implementations, the computer system 110 may obtain the measurement data (e.g., EODP, EOP and/or RPM) from the sensors 115 and may provide the measurement data to the remote computer system 125. The remote computer system 125 may process the measurement data and implement and run the one or more proxy models using the measurement data to monitor the oil level and oil quality of the engine oil used by the engine 105. The well system 100 may monitor the oil level and oil quality of the engine oil using the one or more proxy models and without using specialized sensors that directly measure the oil level and oil quality of the engine oil. For example, by using the proxy models, the well system 100 may not use specialized sensors within the engine oil chamber that directly measure the oil level and oil quality of the engine oil, which reduces the cost of the engine 105. Furthermore, as described further below, using proxy models to monitor the oil level and oil quality may detect oil level and/or oil quality issues earlier in time than using the specialized sensors, which can increase the life of the engine 105 and prevent or reduce engine failures and engine ventilations.

In some implementations, the well system 100 (e.g., the computer system 110 and/or the remote computer system 125) may implement and run proxy models to monitor oil level and oil quality without deploying specialized sensors to directly measure oil level and oil quality. The proxy models may be a function of at least one of EODP, EOP, or RPM (for engine speed) and may identify engine oil (or engine lubricant) properties by evaluating and processing EODP, EOP, and RPM time series data. The proxy models may predict a reduction in oil level (e.g., a low oil level) and a reduction in oil quality (e.g., degraded oil quality) that are below acceptable limits based on analysis of time series data for at least one of EODP, EOP, or RPM using one or more data processing and analysis techniques, such as data cleaning strategies, truncation methods, adaptive windowing, averaging techniques, statistical calculations, and regression analysis, as further described below. In some implementations, the well system 100 may implement an EODP oscillation proxy model. In some implementations, the well system 100 may implement two or more of an EODP oscillation proxy model, an EODP zero proxy model, or an EODP slope proxy model. In some implementations, the well system 100 may implement an EODP oscillation proxy model, an EODP zero proxy model, an EODP slope proxy model, and an EOP and RPM proxy model, as further described below in FIGS. 2-11.

In some implementations, the well system 100 (e.g., the computer system 110 and/or the remote computer system 125) may implement and run an EODP oscillation proxy model using EODP measurement data (e.g., time series data) obtained from the sensors 115 (e.g., pressure sensors) of the engine 105. The EODP oscillation proxy model may be referred to as the first proxy model. In some implementations, the computer system 110 may receive EODP measurement data from the engine 105 (e.g., the sensors 115), and the computer system 110 may provide the EODP measurement data to the remote computer system 125 for processing and analysis using the EODP oscillation proxy model. In some implementations, the computer system 110 at the local well site may process and analyze the EODP measurement data using the EODP oscillation proxy model. After receiving the EODP measurement data, data filtering and data cleaning operations (e.g., adaptive windowing and standard deviation operations) may be performed on the EODP measurement data. After the data filtering and data cleaning, an EODP oscillation indicator may be determined based on the EODP measurement data. For example, an EODP oscillation estimation process may include performing adaptive windowing and statistical calculations on the EODP measurement data to determine the EODP oscillation indicator. The processing of the EODP measurement data to determine the EODP oscillation indicator is further described in FIGS. 2-3. The well system 100 may monitor the oil level and oil quality by determining whether the EODP oscillation indicator is above an EODP oscillation threshold. The EODP oscillation threshold may be determined based on at least one of the engine family of the engine 105, the engine fuel type of the engine 105, or the lubricant type (or viscosity) of the engine oil used by the engine 105. The well system 100 (e.g., the computer system 110 and/or the remote computer system 125) may detect a low oil level and/or a degraded oil quality if the EODP oscillation indicator is above the EODP oscillation threshold, as further described in FIGS. 2-3. In some implementations, the low oil level and/or the degraded oil quality may be detected if the EODP oscillation indicator remains above the EODP oscillation threshold continuously for a time period. The time period may be various different time periods depending on the implementation. In some non-limiting examples, the time period may be a number of minutes, such as 5 minutes, 10 minutes, or 20 minutes, among others.

In some implementations, the well system 100 (e.g., the computer system 110 and/or the remote computer system 125) may implement and run an EODP zero proxy model using EODP measurement data (e.g., time series data) obtained from the sensors 115 (e.g., pressure sensors) of the engine 105. The EODP zero proxy model may be referred to as the second proxy model. In some implementations, the computer system 110 may receive EODP measurement data from the engine 105 (e.g., the sensors 115), and the computer system 110 may provide the EODP measurement data to the remote computer system 125 for processing and analysis using the EODP zero proxy model. In some implementations, the computer system 110 at the local well site may process and analyze the EODP measurement data using the EODP zero proxy model. After receiving the EODP measurement data, data filtering may be performed on the EODP measurement data. Then, an EODP zero inspection may be performed to determine whether the EODP has a value of zero, which may be referred to as an EODP zero value. For example, the EODP zero inspection process may include performing adaptive windowing and statistical evaluation on the EODP measurement data to determine whether the EODP has a value of zero. The processing of the EODP measurement data to determine whether it has an EODP zero value is further described in FIGS. 4-5. The well system 100 may monitor the oil quality by monitoring whether the EODP measure data has a value of zero (i.e., EODP zero value). The well system 100 (e.g., the computer system 110 and/or the remote computer system 125) may detect a degraded oil quality if the EODP measurement data has a zero value, as further described in FIGS. 4-5. In some implementations, the degraded oil quality may be detected if the EODP zero value is detected continuously for a time period. The time period may be various different time periods depending on the implementation. In some non-limiting examples, the time period may be a number of minutes, such as 5 minutes, 10 minutes, or 20 minutes, among others.

In some implementations, the well system 100 (e.g., the computer system 110 and/or the remote computer system 125) may implement and run an EODP slope proxy model using EODP measurement data (e.g., time series data) obtained from the sensors 115 (e.g., pressure sensors) of the engine 105. The EODP slope proxy model may be referred to as the third proxy model. In some implementations, the computer system 110 may receive EODP measurement data from the engine 105 (e.g., the sensors 115), and the computer system 110 may provide the EODP measurement data to the remote computer system 125 for processing and analysis using the EODP slope proxy model. In some implementations, the computer system 110 at the local well site may process and analyze the EODP measurement data using the EODP slope proxy model. After receiving the EODP measurement data, data filtering, data fixing, and data cleaning operations (e.g., adaptive windowing and standard deviation operations) may be performed on the EODP measurement data. Then, an EODP slope may be determined based on the EODP measurement data. For example, an EODP slope estimation process may include performing adaptive windowing, statistical calculations, averaging techniques, and regression analysis on the EODP measurement data to determine the EODP slope. The processing of the EODP measurement data to determine the EODP slope is further described in FIGS. 6-7. The well system 100 may monitor the oil quality by determining whether the EODP slope is above an EODP slope threshold. The EODP slope threshold may be determined based on the engine family of the engine 105. The well system 100 (e.g., the computer system 110 and/or the remote computer system 125) may detect a degraded oil quality if the EODP slope is above the EODP slope threshold, as further described in FIGS. 6-7. In some implementations, the degraded oil quality may be detected if the EODP slope remains above the EODP slope threshold continuously for a time period. The time period may be various different time periods depending on the implementation. In some non-limiting examples, the time period may be a number of minutes, such as 5 minutes, 10 minutes, or 20 minutes, among others.

In some implementations, the well system 100 (e.g., the computer system 110 and/or the remote computer system 125) may implement and run an EOP and RPM proxy model using EOP and RPM measurement data (e.g., time series data) obtained from the sensors 115 (e.g., pressure sensors and engine speed sensors) of the engine 105. The EOP and RPM proxy model may be referred to as the fourth proxy model. In some implementations, the EOP measurements may correspond to one or more engine speed RPM settings. In some implementations, the computer system 110 may receive EOP and RPM measurement data from the engine 105 (e.g., the sensors 115), and the computer system 110 may provide the EOP and RPM measurement data to the remote computer system 125 for processing and analysis using the EOP and RPM proxy model. In some implementations, the computer system 110 at the local well site may process and analyze the EOP and RPM measurement data using the EOP and RPM proxy model. After receiving the EOP and RPM measurement data, data filtering operations may be performed, and a minimum acceptable EOP (or minimum EOP) for different RPM settings may be determined based on the EOP and RPM measurement data and the engine family of the engine 105. In some implementations, regression analysis operations may be performed on the EOP and RPM measurement data based on the engine family to determine the minimum acceptable EOP for different RPM settings. The processing of the EOP and RPM measurement data is further described in FIGS. 8-9. The well system 100 may monitor the oil level by determining whether the EOP is below the minimum acceptable EOP for different RPM settings. The well system 100 (e.g., the computer system 110 and/or the remote computer system 125) may detect a low oil level if the EOP is below the minimum acceptable EOP for one or more RPM settings, as further described in FIGS. 8-9. In some implementations, the low oil level may be detected if the EOP is below the minimum acceptable EOP for one or more RPM settings continuously for a time period. The time period may be various different time periods depending on the implementation. In some non-limiting examples, the time period may be a number of minutes, such as 3 minutes, 5 minutes, or 10 minutes, among others.

In some implementations, the well system 100 (e.g., the computer system 110 and/or the remote computer system 125) may implement the EODP oscillation proxy model to monitor the oil level and the oil quality. In some implementations, the well system 100 may implement two or more of the EODP oscillation proxy model, the EODP zero proxy model, or the EODP slope proxy model to monitor the oil level and the oil quality. In some implementations, the well system 100 may implement one or more of the four proxy models or all four proxy models, e.g., the EODP oscillation proxy model, the EODP zero proxy model, the EODP slope proxy model, and the EOP and RPM proxy model, to monitor the oil level and the oil quality of the engine oil of the engine 105. In some implementations, if the well system 100 detects a low oil level and/or a degraded oil quality, the well system 100 may generate an alert for well site personnel that indicates the low oil level and/or the degraded oil quality. The alert may be any type of notification or message that is delivered to the well site personal via wired or wireless communications. The computer system 110 and/or the remote computer system 125 may generate and provide the alert to the well site personnel. For example, the alert may be displayed on a display device of the computer system 110, a display device of the remote computer system 125, a display device of other well equipment at the well site, or a display device of mobile devices of the well site personnel. As another example, the alert may trigger an alarm or siren or other notification using one or more notification devices at the well site. In some implementations, the alert may cause the computer system 110 and/or the remote computer system 125 to automatically and autonomously shut down the well equipment that uses the engine 105, such as a fracturing pump that uses the engine 105, and potentially other affected well equipment and tools. In some implementations, the alert may notify the well personnel of the low oil level and/or the degraded oil quality and the well personnel may determine whether to manually shutdown the engine 105 and related equipment. In some implementations, the alert may also recommend to the well site personnel to change the engine oil of the engine 105 if the oil quality is degraded or to add additional engine oil to the engine 105 if the oil level is low and/or to change the oil filter of the engine 105. The operations described herein in FIGS. 1-13 may help diagnose and maintain engine health without additional cost of specialized oil level and oil quality sensors, may extend the useful life of an engine by preventing or reducing engine failures, major repairs and engine ventilations, may reduce maintenance costs, and may enhance safety of well personnel working at the well site.

Figure 2:
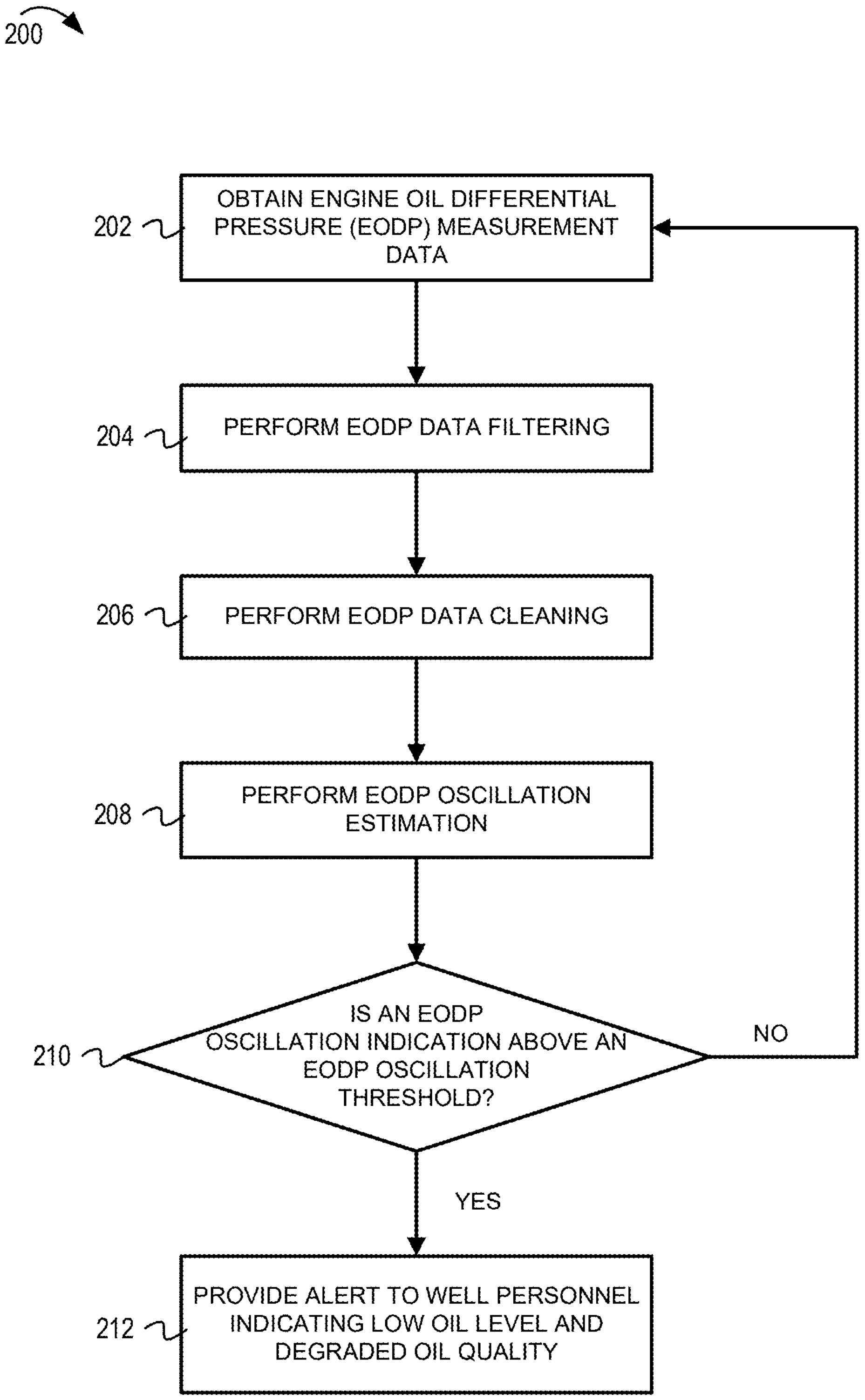
FIG. 2 is a flowchart of example operations for monitoring oil level and oil quality of engine oil using engine oil differential pressure (EODP) oscillation information, according to some implementations.

FIG. 2 is a flowchart 200 of example operations for monitoring oil level and oil quality of engine oil using EODP oscillation information, according to some implementations. In some implementations, the EODP oscillation proxy model may be used to monitor oil level and oil quality of engine oil using EODP measurement data. At block 202, the well system (e.g., the well system 100 described in FIG. 1) may obtain EODP measurement data from one or more sensors (e.g., pressure sensors) of the engine. At block 204, data filtering may be performed on the EODP measurement data. For example, the EODP measurement data may be filtered based on the engine speed RPM. The EODP measurement data may be filtered to select a subset of the EODP measurement data to use for the EODP oscillation proxy model. At block 206, data cleaning may be performed on the EODP measurement data. For example, data cleaning may be performed by using adaptive windowing and standard deviations. When performing the data cleaning, some data is removed in a specific window in the normal distribution of the data. For example, using a backward difference window and assuming a normal distribution, a certain number of standard deviations may be removed both from the beginning and the end of the distribution. As one non-limiting example, two standard deviations may be removed from both the beginning and the end of the distribution. As another non-limiting example, two standard deviations may be removed from the end of the distribution and three standard deviations may be removed from the beginning of the distribution. The EODP data cleaning process may also be referred to as an EODP outlier removal process because a certain amount of data is removed at both ends of the normal distribution of the data. At block 208, after data filtering and data cleaning, an EODP oscillation estimation process may be performed to determine the EODP oscillation indicator from the EODP measurement data. The EODP oscillation estimation process may include performing adaptive windowing and statistical calculations on the EODP measurement data to determine the EODP oscillation indicator. In one non-limiting example, for the adaptive windowing, a backward difference window may be applied, and for the statistical calculations, the EODP tenth percentile (e.g., P10) and the ninetieth percentile (e.g., P90) may be determined. In this example, the EODP oscillation indicator may be determined by taking the difference between the EODP ninetieth percentile and the EODP tenth percentile. It is noted, however, that in other implementations different percentiles may be used and/or different types of adaptive windowing may be used.

At block 210, the well system (e.g., the computer system 110 and/or the remote computer system 125 of FIG. 1) may determine whether the EODP oscillation indicator is above an EODP oscillation threshold. The well system may monitor the oil level and oil quality by determining whether the EODP oscillation indicator is above an EODP oscillation threshold. The EODP oscillation threshold may be determined based on at least one of the engine family of the engine (e.g., the engine 105 of FIG. 1), the engine fuel type of the engine, or the lubricant type (or viscosity) of the engine oil used by the engine. The engine family may be the engine manufacturer or brand. The engine fuel type may be the type of fuel, such as diesel or hybrid/dual fuel (e.g., diesel and natural gas), among others. The lubricant type (or viscosity) may be the type and/or viscosity of the engine oil. At block 212, if the EODP oscillation indicator is above the EODP oscillation threshold, the well system may provide an alert to well personnel that indicates a low oil level and a degraded oil quality. The alert may be provided to well personnel that are at the local well site and/or to well personnel that monitor the well site remotely via a remote computer system (e.g., such as the remote computer system 125 shown in FIG. 1). In some implementations, the low oil level and/or the degraded oil quality may be detected if the EODP oscillation indicator remains above the EODP oscillation threshold continuously for a time period. The time period may be various different time periods depending on the implementation. In some non-limiting examples, the time period may be a number of minutes, such as 5 minutes, 10 minutes, or 20 minutes, among others. If the EODP oscillation indicator is at or below the EODP oscillation threshold (from block 210), the process repeats and the well system continues to obtain EODP measurement data to monitor the oil level and oil quality of the engine oil (block 202).

Figure 3:
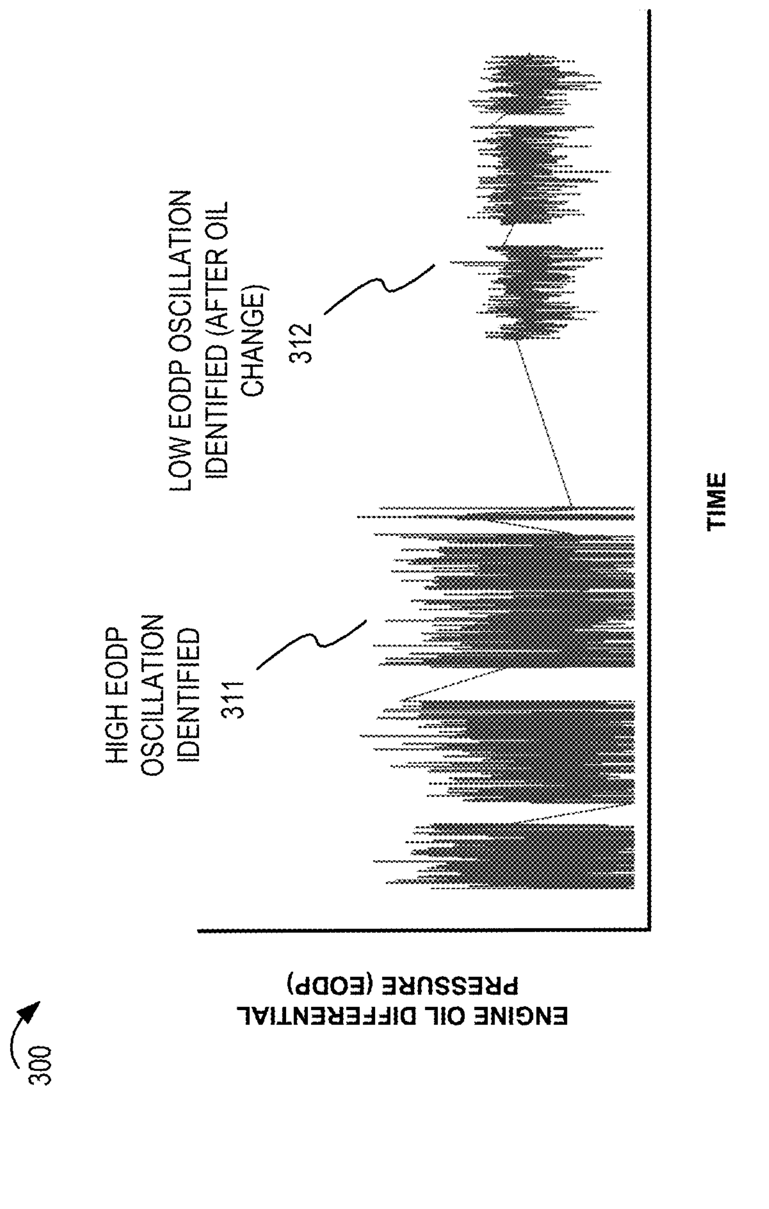
FIG. 3 depicts an example plot showing how the EODP oscillations can trigger the low oil level and the degraded oil quality alert, according to some implementations.

In some implementations, after alerting the well personnel of the low oil level and degraded oil quality, the well personnel may replace the engine oil, or add engine oil, and potentially perform other maintenance operations. In some implementations, in addition to providing an alert to the well personnel, the engine may be stopped and other affected well equipment may be stopped (e.g., some well operations may be halted) automatically and autonomously after detecting the low oil level and the degraded oil quality conditions to prevent engine failure or engine ventilations. FIG. 3 depicts an example plot 300 of how the EODP oscillations can trigger the low oil level and the degraded oil quality alert, according to some implementations. As shown in FIG. 3, when the low oil level and the degraded oil quality conditions exist in the engine of the well system, the EODP oscillation has a relatively high amplitude 311, which results in the EODP oscillation indicator being above the EODP oscillation threshold. This condition may trigger the alert and may flag the corresponding engine (or well equipment) as having a low oil level and degraded oil quality. After the engine oil is changed in the engine, the EODP oscillation has a relatively low amplitude 312, which results in the EODP oscillation indicator being below the EODP oscillation threshold.

Figure 4:
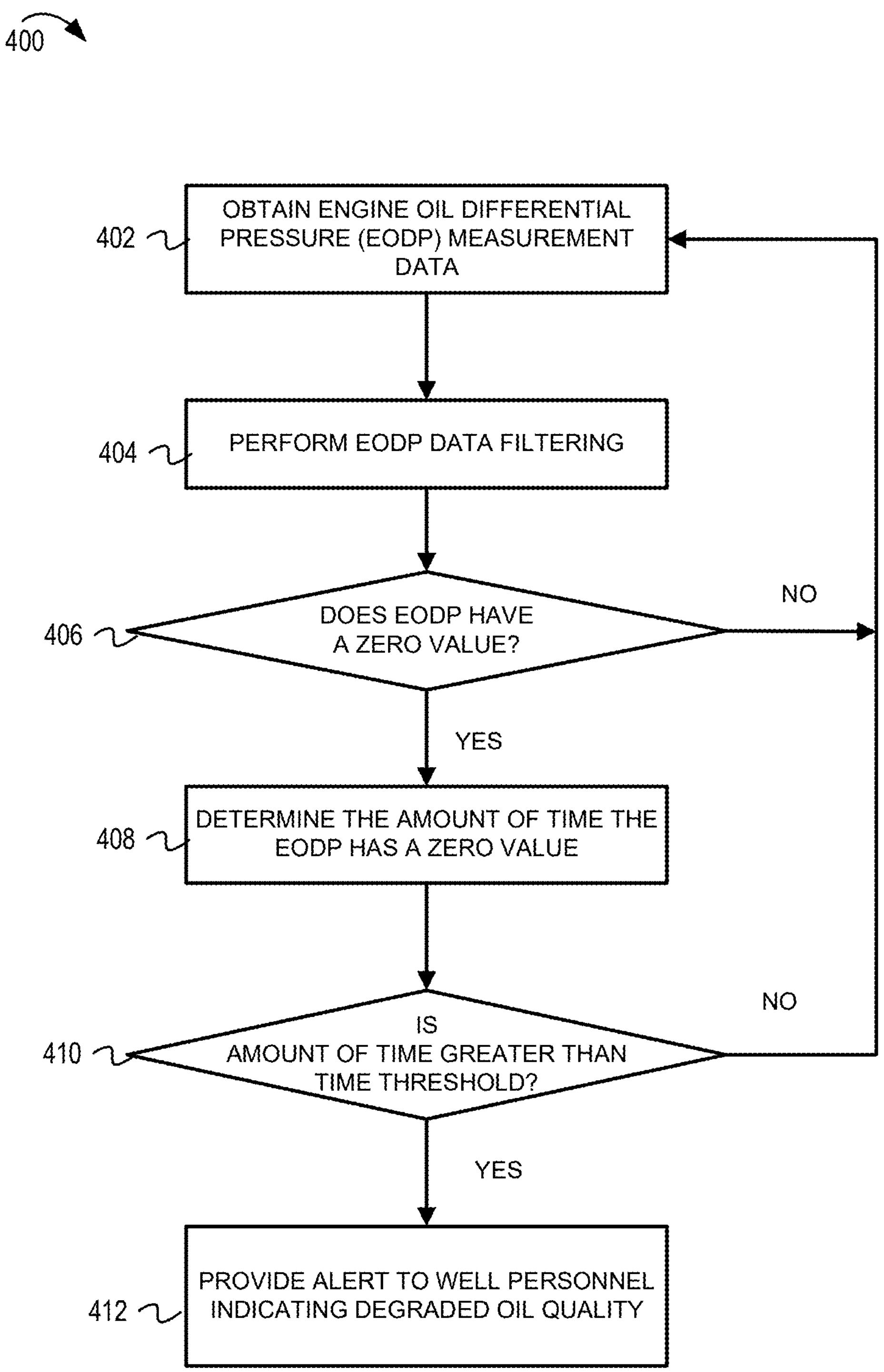
FIG. 4 is a flowchart of example operations for monitoring oil quality of engine oil using EODP zero information, according to some implementations.

FIG. 4 is a flowchart 400 of example operations for monitoring oil quality of engine oil using EODP zero information, according to some implementations. At block 402, the well system (e.g., the well system 100 of FIG. 1) may obtain EODP measurement data from one or more sensors (e.g., pressure sensors) of the engine. At block 404, data filtering may be performed on the EODP measurement data. For example, the EODP measurement data may be filtered based on the engine speed RPM. The EODP measurement data may be filtered to select a subset of the EODP measurement data to use for the EODP zero proxy model. At block 406, the well system may perform an EODP zero inspection process to determine whether the EODP has a zero value. In some implementations, the EODP zero inspection process may include performing adaptive windowing and statistical calculations on the EODP measurement data to determine whether the EODP has a zero value. At 408, if it is determined that the EODP has a zero value (i.e., an EODP zero), the well system may determine the amount of time the EODP has a zero value. For example, a timer may be started when an EODP zero is detected. At block 410, the well system may determine whether the amount of time the EODP zero is detected is greater than a time threshold. The well system may determine whether the EODP has a value of zero continuously for at least the time threshold. The time threshold may also be referred to as the EODP zero time threshold. At block 412, if the amount of time is greater than the time threshold, the well system may provide an alert to the well personnel that indicates the degraded oil quality. In some implementations, the degraded oil quality may be detected if the amount of time the EODP has a value of zero continuously is greater than the time threshold. The time threshold may be various different time periods depending on the implementation. In some non-limiting examples, the time threshold may be a number of minutes, such as 5 minutes, 10 minutes, or 20 minutes, among others. If the EODP does not have a value of zero (from block 406) or if the amount of time the EODP value of zero is less than or equal to the time threshold (from block 410), the process repeats and the well system continues to obtain EODP measurement data to monitor the oil quality of the engine oil (block 402).

Figure 5:
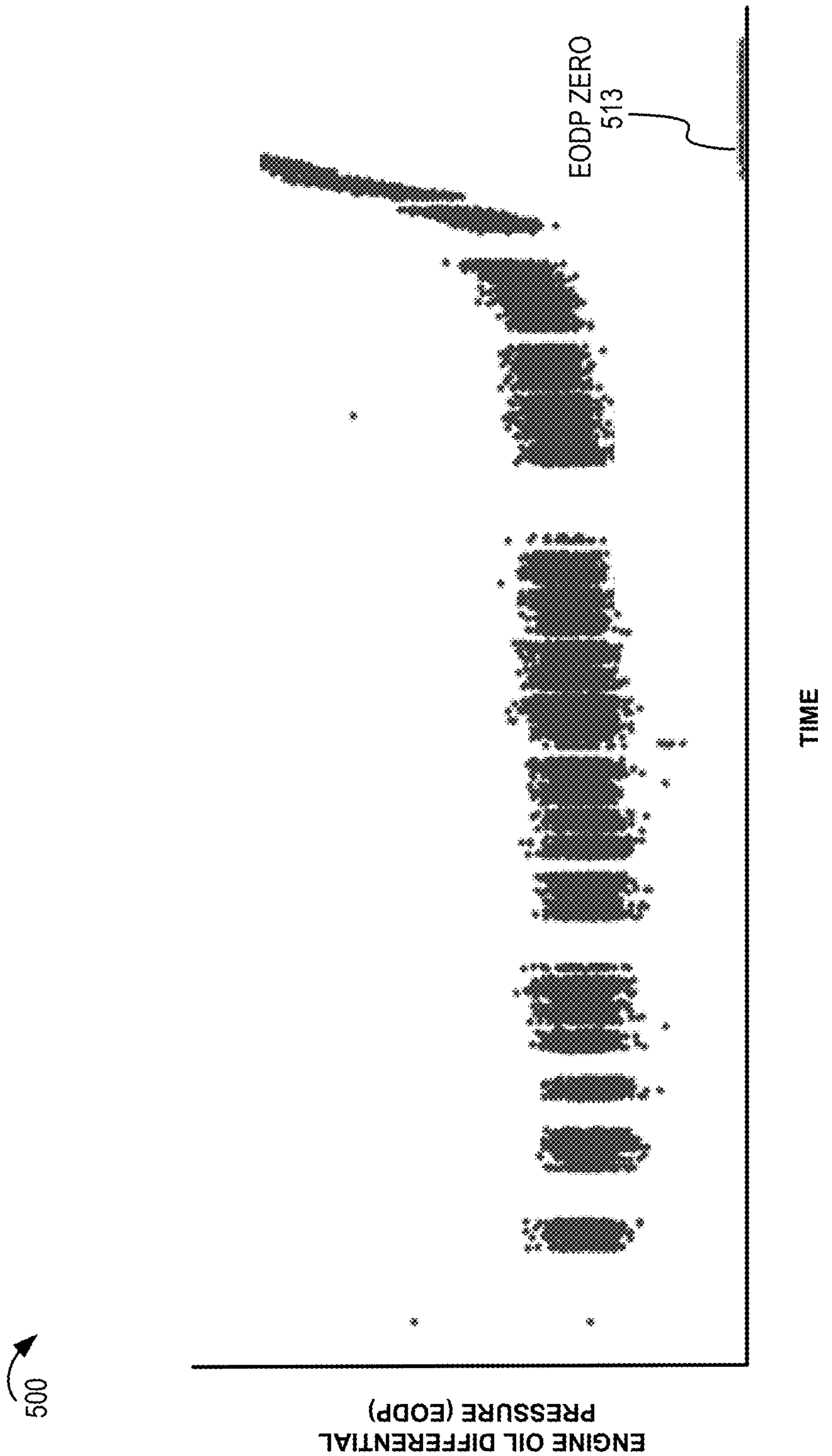
FIG. 5 depicts an example plot of the EODP having a zero value and triggering the degraded oil quality alert, according to some implementations.

In some implementations, after alerting the well personnel of the degraded oil quality, the well personnel may replace the engine oil, or add engine oil, and potentially perform other maintenance operations. In some implementations, in addition to providing an alert to the well personnel, the engine may be stopped and other affected well equipment may be stopped (e.g., some well operations may be halted) automatically and autonomously after detecting the degraded oil quality conditions to prevent engine failure or engine ventilations. FIG. 5 depicts an example plot 500 of the EODP having a zero value and triggering the degraded oil quality alert, according to some implementations. As shown in FIG. 5, when the degraded oil quality conditions exist in the well system, the EODP may have a value of zero 513. The EODP may remain at a value of zero continuously for an amount of time that is greater than the time threshold, which triggers the degraded oil quality alert. The degraded oil quality alert may flag the corresponding engine as having a degraded oil quality, or as having oil bypass (which tends to have degraded oil quality), or both.

Figure 6:
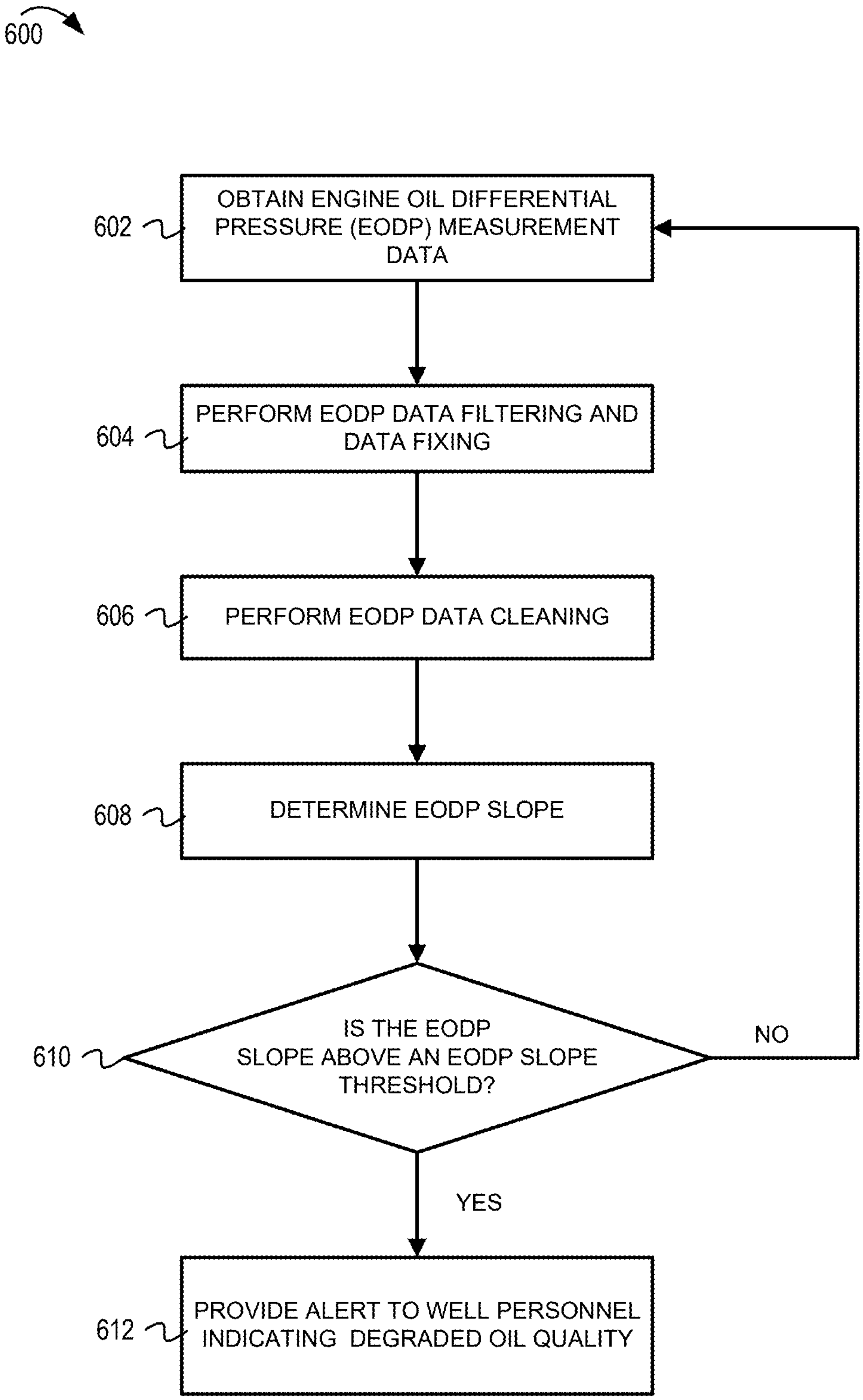
FIG. 6 is a flowchart of example operations for monitoring oil quality of engine oil using EODP slope information, according to some implementations.

FIG. 6 is a flowchart 600 of example operations for monitoring oil quality of engine oil using EODP slope information, according to some implementations. In some implementations, the EODP slope proxy model may be used to monitor oil quality of engine oil using EODP measurement data. At block 602, the well system (e.g., the well system 100 described in FIG. 1) may obtain EODP measurement data from one or more sensors (e.g., pressure sensors) of the engine. At block 604, data filtering and data fixing may be performed on the EODP measurement data. For example, the EODP measurement data may be filtered based on the engine speed RPM. The EODP measurement data may be filtered to select a subset of the EODP measurement data to use for the EODP slope proxy model. Furthermore, optionally in some cases, data fixing is performed on the EODP measurement data by performing an engine hours correction. Engine hours (or time in hours) may be used for the EODP slope calculations. The engine hours variable should increase monotonically over time; however, in some instances, this phenomenon is not fully present due to issues associated with the raw dataset. Thus, the engine hour correction process may be optionally performed to correct the engine hour variable. At block 606, data cleaning may be performed on the EODP measurement data. For example, data cleaning may be performed by using adaptive windowing and standard deviations. When performing the data cleaning, some data is removed in a specific window in the normal distribution of the data. For example, using a central difference window and assuming a normal distribution, a certain number of standard deviations may be removed both from the beginning and the end of the distribution. As one non-limiting example, two standard deviations may be removed from both the beginning and the end of the distribution. As another non-limiting example, two standard deviations may be removed from the end of the distribution and three standard deviations may be removed from the beginning of the distribution. The EODP data cleaning process may also be referred to as an EODP outlier removal process because a certain amount of data is removed at both ends of the normal distribution of the data.

At block 608, the EODP slope (or EODP rate of change) may be determined from the EODP measurement data. In some implementations, an EODP slope estimation process may be performed, which may include performing adaptive windowing, statistical calculations, average techniques, and regression analysis on the EODP measurement data to determine the EODP slope. In one non-limiting example, three central difference windows may be applied to calculate (1) the EODP ninetieth percentile (e.g., P90), (2) the moving average (MA) of the EODP ninetieth percentile, and (3) the EODP linear slope dividing the covariance (X, Y) and variance (X), where the variables X and Y represent the engine hours and the EODP ninetieth percentile with MA, respectively. It is noted, however, that in other implementations different percentiles may be used and/or different types of adaptive windowing may be used. At block 610, after determining the EODP slope, the well system (e.g., the computer system 110 and/or the remote computer system 125 of FIG. 1) may determine whether the EODP slope is above an EODP slope threshold. The well system may monitor the oil quality or whether the oil filter is partially clogged by determining whether the EODP slope is above the EODP slope threshold. In some implementations, the EODP slope threshold may be determined based on the engine family. The engine family may be the engine manufacturer or brand. The engine oil quality may begin to degrade when the EODP slope increase and crosses the EODP slope threshold, which may be dependent on the engine family. At block 612, if the EODP slope is above the EODP slope threshold, the well system may provide an alert to well personnel that indicates a partially clogged oil filter and a degraded oil quality. The alert may be provided to well personnel that are at the local well site and/or to well personnel that monitor the well site remotely via a remote computer system (e.g., such as the remote computer system 125 shown in FIG. 1). In some implementations, the degraded oil quality (and partially clogged oil filter) may be detected if the EODP slope remains above the EODP slope threshold continuously for a time period. The time period may be various different time periods depending on the implementation. In some non-limiting examples, the time period may be a number of minutes, such as 1 minutes, 3 minutes, or 5 minutes, among others. If the EODP slope is at or below the EODP slope threshold (from block 610), the process repeats and the well system continues to obtain EODP measurement data to monitor the oil quality of the engine oil (block 602).

Figure 7:
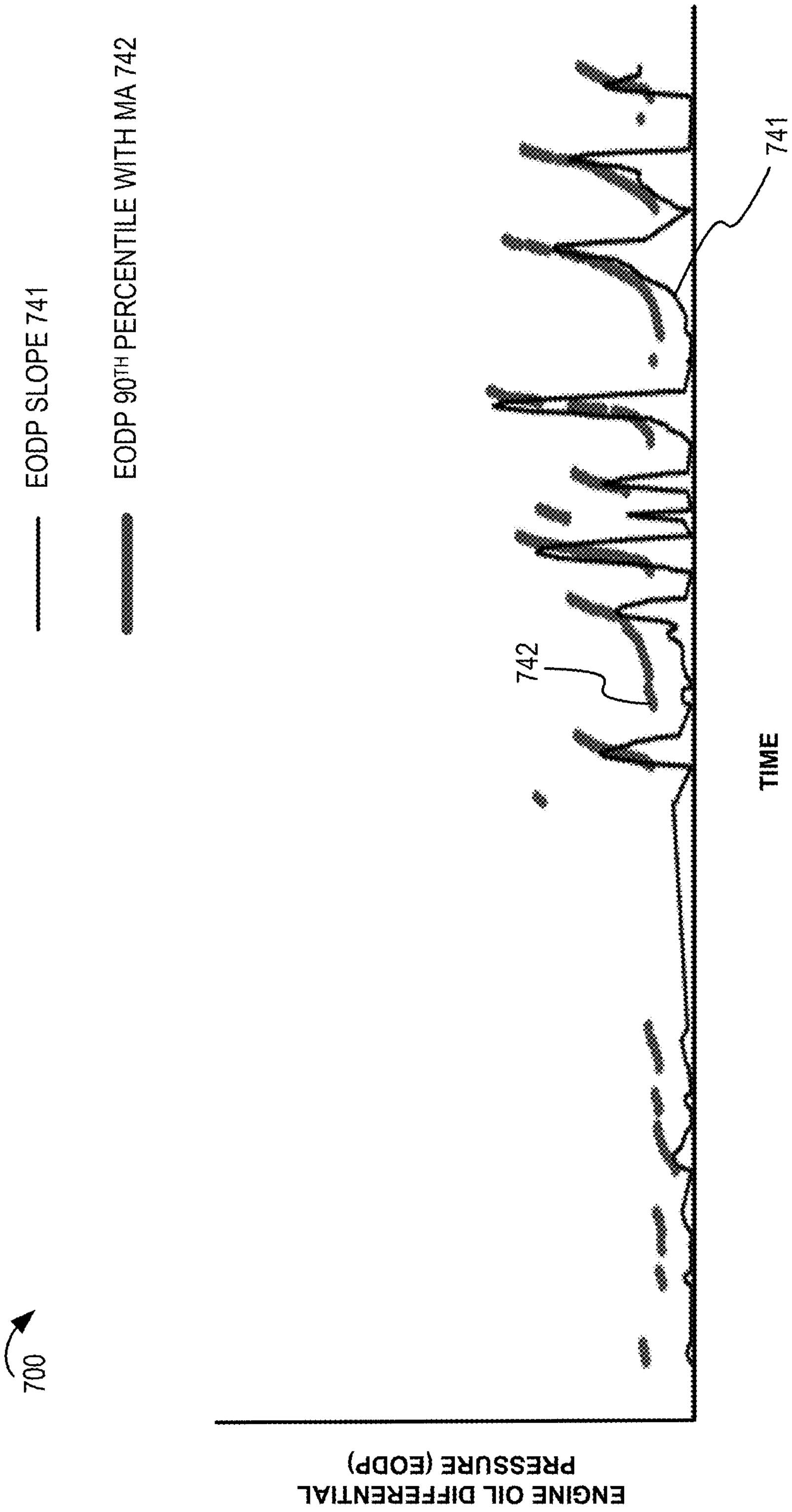
FIG. 7 depicts an example plot showing how the EODP slope can trigger the degraded oil quality alert, according to some implementations.

In some implementations, after alerting the well personnel of the degraded oil quality, the well personnel may replace the engine oil, or add engine oil, and potentially perform other maintenance operations. In some implementations, in addition to providing an alert to the well personnel, the engine may be stopped and other affected well equipment may be stopped (e.g., some well operations may be halted) automatically and autonomously after detecting the degraded oil quality conditions to prevent engine failure or engine ventilations. FIG. 7 depicts an example plot 700 of how the EODP slope can trigger the degraded oil quality alert, according to some implementations. As shown in FIG. 7, when the degraded oil quality conditions exist in the engine of the well system, the EODP slope 741 may be detected above the EODP slope threshold. FIG. 7 also shows the EODP ninetieth percentile (with MA) 742. It is noted, however, that in other implementations different percentiles may be used. The EODP slope being above the EODP slope threshold may trigger the alert and may flag the corresponding engine (or well equipment) as having the degraded oil quality and partially clogged oil filter. The well personnel may be alerted before the oil filter is fully clogged. In some implementations, the EODP slope proxy model may be run periodically, such as every few hours, in order to monitor the oil quality and oil filter condition.

Figure 8:
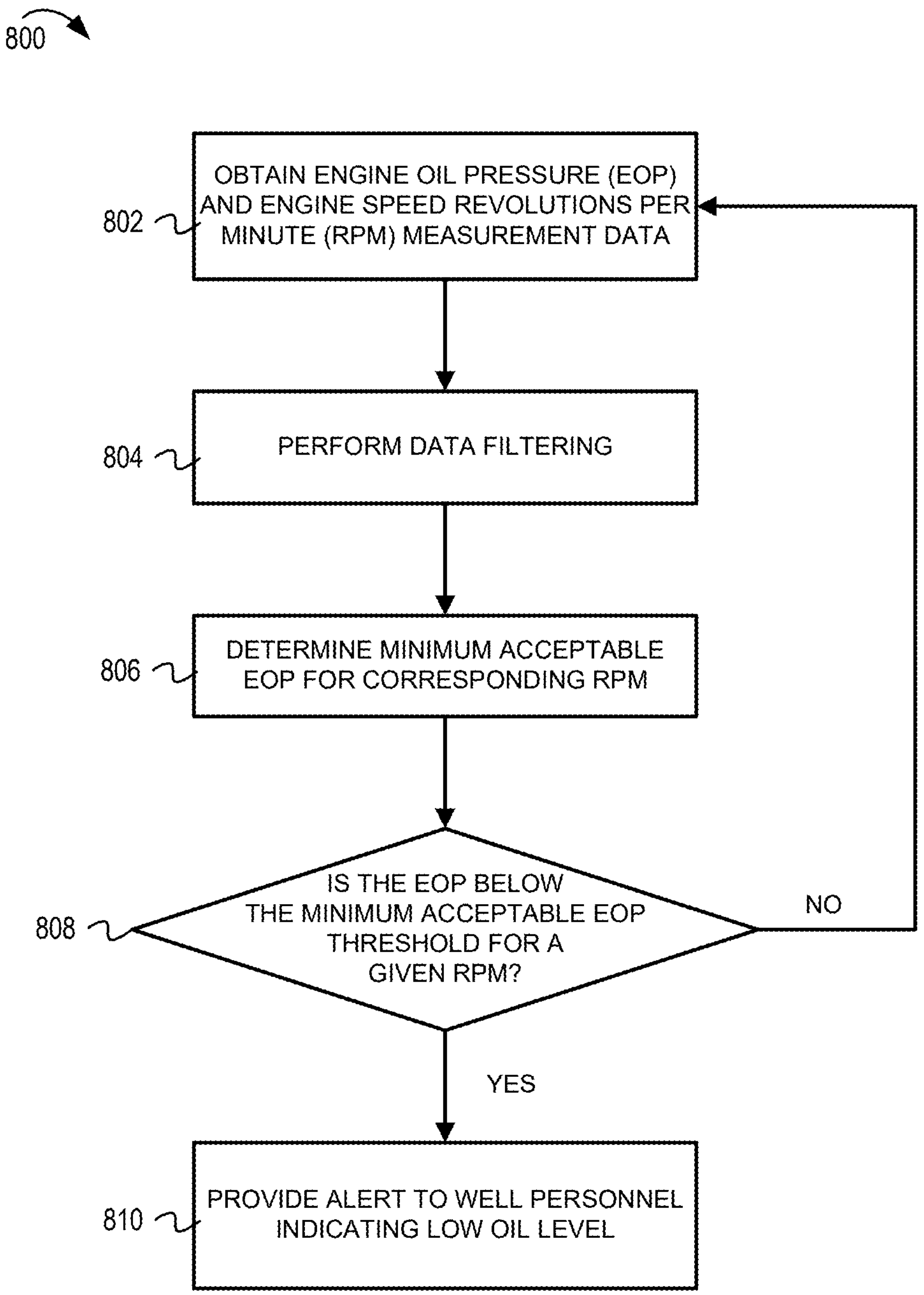
FIG. 8 is a flowchart of example operations for monitoring oil level of engine oil using EOP and engine speed RPM information, according to some implementations.
Figure 9:
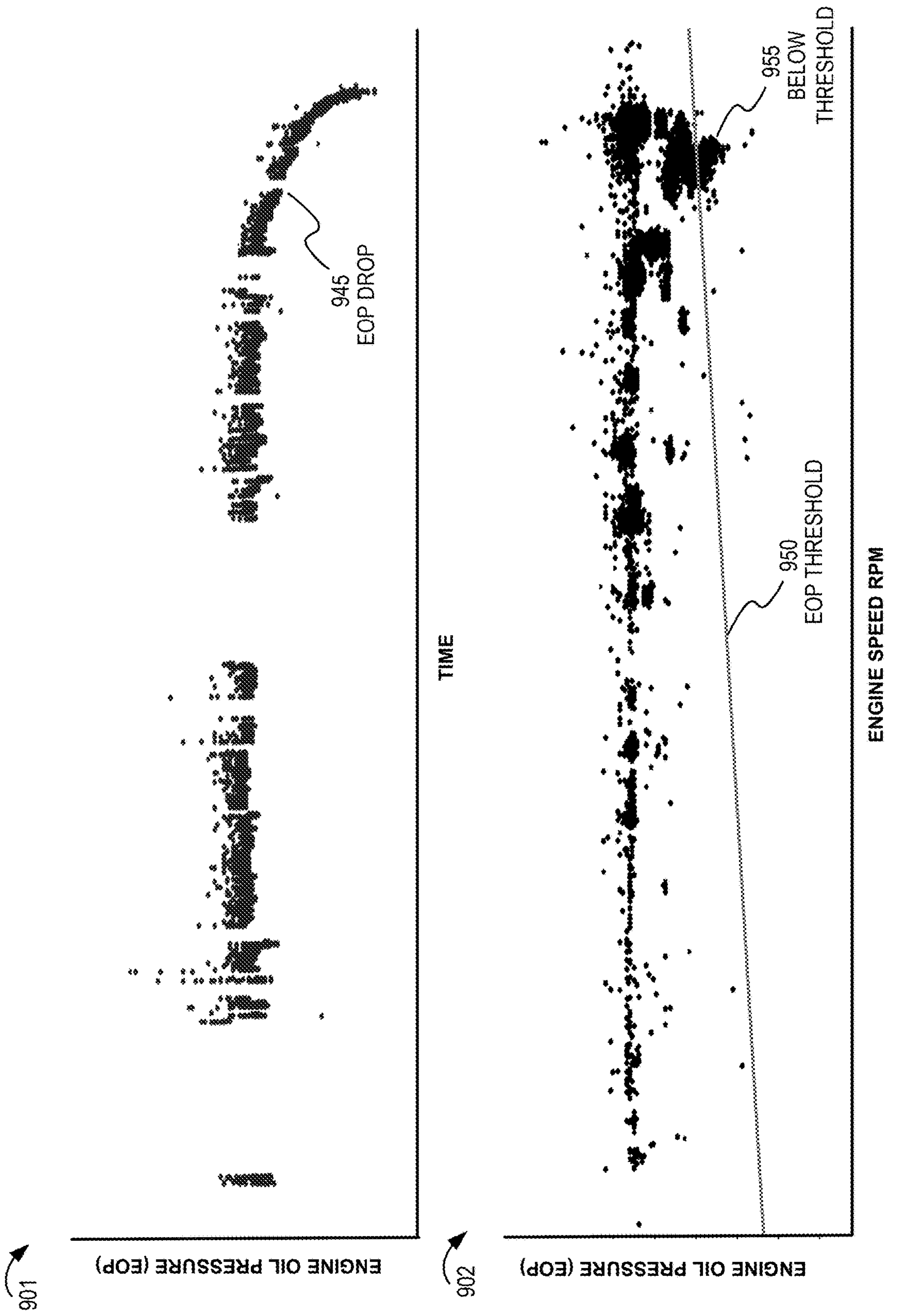
FIG. 9 depicts example plots showing how engine oil pressure (EOP) and revolutions per minute (RPM) measurements can trigger the low oil level alert, according to some implementations.

FIG. 8 is a flowchart 800 of example operations for monitoring oil level of engine oil using EOP and engine speed RPM information, according to some implementations. In some implementations, the EOP and RPM proxy model may be used to monitor the oil level of engine oil using EOP and RPM measurement data. At block 802, the well system (e.g., the well system 100 described in FIG. 1) may obtain EOP and RPM measurement data from one or more sensors (e.g., pressure and engine speed sensors) of the engine. At block 804, data filtering may be performed on the EOP and RPM measurement data. For example, the EOP measurement data may be filtered based on the engine speed RPM and discharge rate. At block 806, a minimum acceptable EOP for a corresponding RPM is determined. For example, the minimum acceptable EOP may vary as a function of the RPM (e.g., as shown in FIG. 9). In some implementations, the minimum acceptable EOP may be determined based on the engine family. The engine family may be the engine manufacturer or brand. For example, a linear regression analysis may be performed as a function of the engine family to define the minimum acceptable EOP based on the corresponding engine speed RPM. The minimum acceptable EOP may also be referred to as a minimum acceptable EOP threshold, a minimum EOP, or a minimum EOP threshold.

At block 808, the well system (e.g., the computer system 110 and/or the remote computer system 125 of FIG. 1) may determine if the EOP is below the minimum acceptable EOP threshold for a given RPM. The well system may monitor the oil level by determining whether the EOP is below the minimum acceptable EOP threshold for a corresponding RPM. At block 810, if the EOP is below the minimum acceptable EOP threshold for the corresponding RPM, the well system may provide an alert to well personnel that indicates a low oil level. The alert may be provided to well personnel that are at the local well site and/or to well personnel that monitor the well site remotely via a remote computer system (e.g., such as the remote computer system 125 shown in FIG. 1). In some implementations, the low oil level may be identified if the EOP is below the minimum acceptable EOP threshold for the corresponding RPM continuously for a time period. The time period may be various different time periods depending on the implementation. In some non-limiting examples, the time period may be a number of minutes, such as 3 minutes, 5 minutes, or 10 minutes, among others. If the EOP is greater than or equal to the minimum acceptable EOP threshold for the corresponding RPM (from block 808), the process repeats and the well system continues to obtain EOP and RPM measurement data to monitor the oil level of the engine oil (block 802).

In some implementations, after alerting the well personnel of the low oil level, the well personnel may replace the engine oil, or add engine oil, and potentially perform other maintenance operations. In some implementations, in addition to providing an alert to the well personnel, the engine may be stopped and other affected well equipment may be stopped (e.g., some well operations may be halted) automatically and autonomously after detecting the low oil level and the degraded oil quality conditions to prevent engine failure or engine ventilations. FIG. 9 depicts example plots 901 and 902 showing how EOP and RPM measurements can trigger the low oil level alert, according to some implementations. Plot 901 shows EOP versus time measurements showing an EOP drop 945 over time. Plot 902 shows EOP versus engine speed RPM measurements. Plot 902 shows the minimum acceptable EOP threshold 950. Also, plot 902 shows some EOP measurements 955 for some corresponding RPM settings that are below the minimum acceptable EOP threshold 950. When the low oil level conditions exist in the engine of the well system, the EOP for a corresponding RPM may be below the minimum acceptable EOP threshold 950, such as the EOP measurements 955 shown in plot 902. This condition may trigger the alert and may flag the corresponding engine (or well equipment) as having a low oil level.

FIG. 10 depicts an example chart 1000 of various combinations of implementing proxy models for monitoring engine oil level and engine oil quality, according to some implementations. FIG. 10 shows one non-limiting example of different severities of the engine oil level and engine oil quality issues that can be detected using the proxy models. As shown in FIG. 10, in one example, when just the first proxy model (M1) or the EODP oscillation proxy model is implemented, the well system can use the EODP oscillation proxy model to detect moderate oil quality issues and severe oil level issues. When just the second proxy model (M2) or the EODP zero proxy model is implemented, the well system can use the EODP zero proxy model to detect severe oil quality issues. When just the third proxy model (M3) or the EODP slope proxy model is implemented, the well system can use the EODP slope proxy model to detect severe oil quality issues. When just the fourth proxy model (M4) or the EOP and RPM proxy model is implemented, the well system can use the EOP and RPM proxy model to detect severe oil level issues. When the EODP oscillation proxy model (M1) and the EODP zero model (M2) are implemented, the well system can use the proxy models to detect severe oil quality and severe oil level issues. When the EODP oscillation proxy model (M1) and the EODP slope model (M3) are implemented, the well system can use the proxy models to detect severe oil quality and severe oil level issues. When the EODP oscillation proxy model (M1) and the EOP and RPM proxy model (M4) are implemented, the well system can use the proxy models to detect moderate oil quality and severe oil level issues. When the EODP zero proxy model (M2) and the EODP slope proxy model (M3) are implemented, the well system can use the proxy models to detect severe oil quality issues. When the EODP zero proxy model (M2) and the EOP and RPM proxy model (M4) are implemented, the well system can use the proxy models to detect severe oil quality and severe oil level issues. When the EODP slope proxy model (M3) and the EOP and RPM proxy model (M4) are implemented, the well system can use the proxy models to detect severe oil quality and severe oil level issues.

Figure 11:
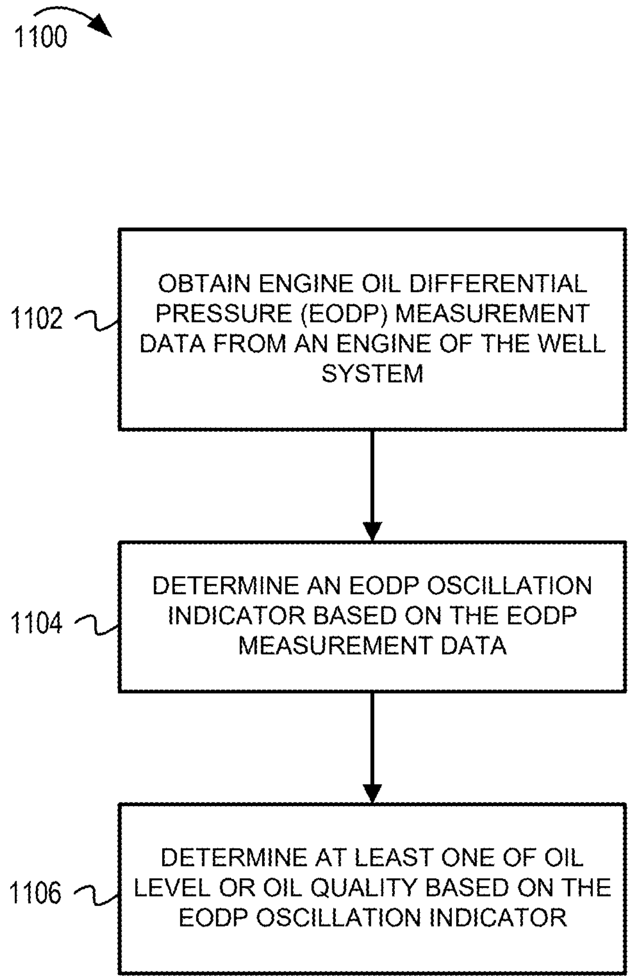
FIG. 11 is a flowchart of example operations for monitoring oil level and oil quality of engine oil based on EODP oscillation information, according to some implementations.

FIG. 11 is a flowchart 1100 of example operations for monitoring oil level and oil quality of engine oil based on EODP oscillation information, according to some implementations. In some implementations, engine oil differential pressure (EODP) measurements data may be obtained from an engine of the well system (block 1102). In some implementations, an EODP oscillation indicator may be determined based on the EODP measurement data (block 1104). In some implementations, at least one of oil level or oil quality may be determined based on the EODP oscillation indicator (block 1106).

In some implementations, it may be determined whether the EODP oscillation indicator is greater than an EODP oscillation threshold. At least one of a low oil level or a degraded oil quality is detected in response to determining the EODP oscillation indicator is greater than the EODP oscillation threshold. In some implementations, it may be determined whether the EODP measurement data has an EODP zero value, whether the EODP slope is greater than an EODP slope threshold, and whether the EOP measurement data is below a minimum EOP threshold. In some implementations, at least one of the low oil level or the degraded oil quality may be detected in response to determining at least one of the EODP oscillation indicator being greater than the EODP oscillation threshold, the EODP measurement data having the EODP zero value, the EODP slope being greater than the EODP slope threshold, or the EOP measurement data being below the minimum EOP threshold.

FIG. 12 depicts an example computer system that can be implemented in surface equipment of a well system or in a remote computer network for monitoring oil level and oil quality of engine oil used by an engine of a well system, according to some implementations. In some implementations, the computer system 1200 may be an example of a computer system that may be used during the operation of the well system, such as the computer system 110 shown in FIG. 1. For example, the computer system 1200 may be a standalone computer system (such as a workstation, laptop, or desktop) or may be integrated into other surface equipment of the well system. In some implementations, the computer system 1200 may be a remote computer system (i.e., remote from the local well site), such as a remote server in a cloud computer network or in a remote monitoring facility. The computer system 1200 may include one or more processors 1201 (possibly including multiple cores, multiple nodes, and/or implementing multi-threading, etc.). The computer system 1200 may include memory 1207. The memory 1207 may be system memory or any type or implementation of machine or computer readable media having instructions that are executable by the one or more processors 1201 to implement the operations described in FIGS. 1-11. The memory 1207 may be system memory or any type or implementation of machine or computer readable and writable media having the ability to receive, process and/or store measurement data from well equipment, devices and tools (including those described in FIGS. 1-11). The computer system 1200 also may include a bus 1203 and a network interface 1205. The computer system 1200 also may include a communications module 1208 that may control wired and wireless communications, such as communicating with downhole devices or tools and communicating with other surface equipment (such as well equipment having an engine that uses engine oil). The computer system 1200 also may include at least a well system measurement unit 1250 and a drilling or fracturing control unit 1260, among other processing units or modules that are used during the operation of the well system and the well equipment described herein. For example, the well system measurement unit 1250 may control above ground and downhole equipment and tools to obtain measurement data (e.g., such as to EODP, EOP and RPM measurements) and store other system metrics, and may process the measurements as described in FIGS. 1-11 to monitor engine oil level and engine oil quality in a well system. The drilling or fracturing control unit 1260 may adjust or modify or halt the drilling or fracturing operation, control well equipment, and/or adjust or modify a drilling or fracturing parameter, based on the results from the monitoring of the engine oil level and engine oil quality, as described above in FIGS. 1-11. In some implementations, the well system measurement unit 1250 may include an EODP measurement unit 1251 for obtaining, processing and analyzing EODP measurement data, an EOP and RPM measurement unit 1252 for obtaining, processing and analyzing EOP and RPM measurement data, and a proxy model unit 1253 for implementing the proxy models based on the EODP, EOP and RPM measurement data and generating alert signals, as described above in FIGS. 1-11. In some implementations, the computer system 1200 may implement the EODP measurement unit 1251, the EOP and RPM measurement unit 1252, and/or the proxy model unit 1253 using machine learning techniques and modules. The functionality described herein may be implemented with an application-specific integrated circuit, in logic implemented in the processor(s) 1201, in a co-processor on a peripheral device or card, etc. Further, implementations may include fewer or additional components not illustrated in FIG. 12. The processor(s) 1201 and the network interface 1205 may be coupled to the bus 1203. Although illustrated as being coupled to the bus 1203, the memory 1207 may be coupled to the processor(s) 1201.

Figure 13:
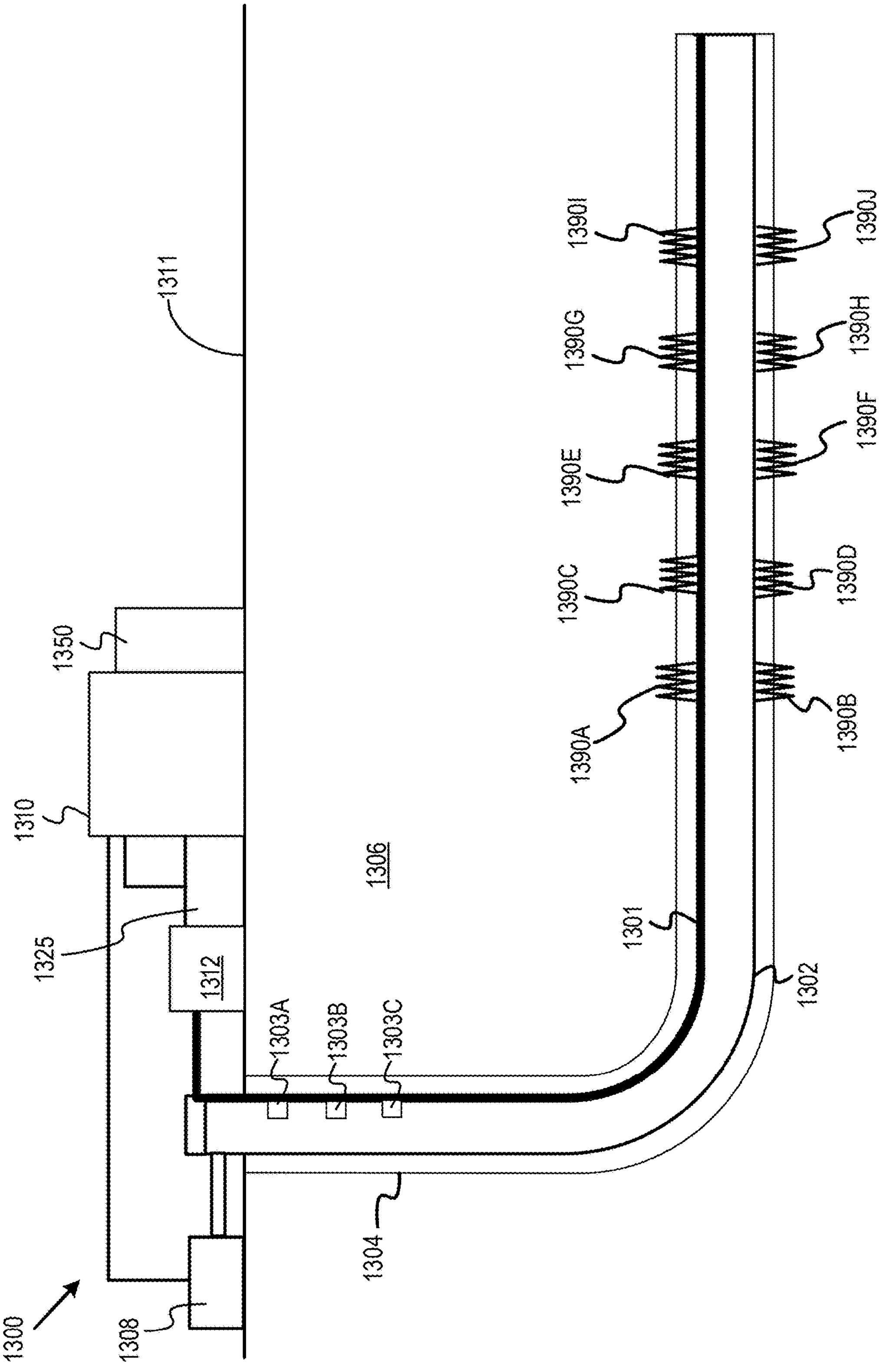
FIG. 13 is a schematic diagram of an example well system that is configured to monitor oil level and oil quality of engine oil used by an engine of the well system, according to some implementations.

Although some example well systems are shown in FIGS. 1 and 13, it is noted, however, that the well system and operations described in FIGS. 1-13 can be used in any type of well system in the oil and gas industry. For example, the well systems may be any type of drilling well systems, fracturing well systems, completion well systems, and producing well systems.

FIG. 13 is a schematic diagram of an example well system that is configured to monitor oil level and oil quality of engine oil used by an engine of the well system, according to some implementations. A well system 1300 may comprise a wellbore 1304 in a subsurface formation 1306. The wellbore 1304 may include a casing 1302 and a number of perforations 1390A-1390J being made in the casing 1302 at different depths as part of hydraulic fracturing to allow hydraulic communication between the subsurface formation 1306 and the casing 1302 and to allow fracturing at different zones. The well system 1300 may also include a computer system 1310 that is configured to perform the operations described above with reference to FIGS. 1-12 for monitoring oil level and oil quality of engine oil used by an engine of the well system 1300. The computer system 1310 may be representative of the computer system 110 shown in FIG. 1 and the computer system 1200 shown in FIG. 12. The well system 1300 may also include one or more pumps, (such as a pump 1308) that may pump fracturing fluid or fracturing treatments during the fracturing operations. The pump 1308 and one or more other well equipment have an engine, such as the engine 105 described with reference to FIG. 1.

In some implementations, the well system 1300 also may include a fiber optic cable 1301. In some implementations, the fiber optic cable 1301 may be temporarily deployed (e.g., using a deployment tool) and can be removed from the wellbore 1304. In some implementations, the fiber optic cable 1301 may be cemented in place in the annular space between the casing 1302 of the wellbore 1304 and the subsurface formation 1306. In some implementations, the fiber optic cable 1301 may be clamped to the outside of the casing 1302 during deployment and protected by centralizers and cross coupling clamps. The fiber optic cable 1301 may house one or more optical fibers, and the optical fibers may be single mode fibers, multi-mode fibers, or a combination of single mode and multi-mode optical fibers.

In some implementations, the fiber optic cable 1301 may be used for distributed sensing where acoustic, strain, and temperature data may be collected. The data may be collected at various positions distributed along the fiber optic cable 1301. For example, data may be collected every 1-3 ft along the full length of the fiber optic cable 1301. The fiber optic cable 1301 may be included with coiled tubing, wireline, loose fiber using coiled tubing, or gravity deployed fiber coils that unwind the fiber as the coils are moved in the wellbore 1304. The fiber optic cable 1301 also may be deployed with pumped down coils and/or self-propelled containers. Additional deployment options for the fiber optic cable 1301 may include coil tubing and wireline deployed coils where the fiber optic cable 1301 is anchored at the toe of the wellbore 1304. In such embodiments, the fiber optic cable 1301 may be deployed when the wireline or coiled tubing is removed from the wellbore 1304. The distribution of sensors shown in FIG. 13 is for example purposes only. Any suitable sensor deployment may be used. For example, the well system 1300 may include fiber optic cable deployed sensors or sensors cemented into the casing. Different types of sensors deployments also may be combined in a single well, such as including both sensors cemented to the casing and sensors in plugs, flow metering devices, etc. in a single well system.

In some implementations, a fiber optic interrogation unit 1312 may be located on the surface 1311 of the well system 1300. The fiber optic interrogation unit 1312 may be directly coupled to the fiber optic cable 1301. Alternatively, the fiber optic interrogation unit 1312 may be coupled to a fiber stretcher module, wherein the fiber stretcher module is coupled to the fiber optic cable 1301. The fiber optic interrogation unit 1312 may receive measurement values taken and/or transmitted along the length of the fiber optic cable 1301 such as acoustic, temperature, strain, etc. The fiber optic interrogation unit 1312 may be electrically connected to a digitizer to convert optically transmitted measurements into digitized measurements. The well system 1300 may contain multiple sensors, such as sensors 1303A-C. There may be any suitable number of sensors placed at any suitable location in the wellbore 1304. The sensors 1303A-C may include pressure sensors, distributed fiber optic sensors, point temperature sensors, point acoustic sensors, interferometric sensors or point strain sensors. Distributed fiber optic sensors may be capable of measuring distributed acoustic data, distributed temperature data, and distributed strain data. Any of the sensors 1303A-C may be communicatively coupled (not shown) to other components of the well system 1300 (e.g., the computer 1310). In some implementations, the sensors 1303A-C may be cemented to a casing 1302.

In some implementations, the computer 1310 may also receive the electrically transmitted measurements from the fiber optic interrogation unit 1312 using a connector 1325. The computer 1310 may include a signal processor to perform various signal processing operations on signals captured by the fiber optic interrogation unit 1312 and/or other components of the well system 1300. The computer 1310 may have one or more processors and a memory device to analyze the measurements and graphically represent analysis results on the display device 1350.

In some implementations, the fiber optic interrogation unit 1312 may operate using various sensing principles including but not limited to amplitude-based sensing systems like Distributed Temperature Sensing (DTS), DAS, Distributed Vibration Sensing (DVS), and Distributed Strain Sensing (DSS). For example, the DTS system may be based on Raman and/or Brillouin scattering. A DAS system may be a phase sensing-based system based on interferometric sensing using homodyne or heterodyne techniques where the system may sense phase or intensity changes due to constructive or destructive interference. The DAS system may also be based on Rayleigh scattering and, in particular, coherent Rayleigh scattering. A DSS system may be a strain sensing system using dynamic strain measurements based on interferometric sensors (e.g., sensors 1303A-C) or static strain sensing measurements using Brillouin scattering. DAS systems based on Rayleigh scattering may also be used to detect dynamic strain events. Temperature effects may in some cases be subtracted from both static and/or dynamic strain events, and temperature profiles may be measured using Raman based systems and/or Brillouin based systems capable of differentiating between strain and temperature, and/or any other optical and/or electronic temperature sensors, and/or any other optical and/or electronic temperature sensors, and/or estimated thermal events.

In some implementations, the fiber optic interrogation unit 1312 may measure changes in optical fiber properties between two points in the optical fiber at any given point, and these two measurement points move along the optical sensing fiber as light travels along the optical fiber. Changes in optical properties may be induced by strain, vibration, acoustic signals and/or temperature as a result of the fluid flow. Phase and intensity based interferometric sensing systems may be sensitive to temperature and mechanical, as well as acoustically induced, vibrations. The fiber optic interrogation unit 1312 may capture DAS data in the time domain. One or more components of the well system 1300 may convert the DAS data from the time domain to frequency domain data using Fast Fourier Transforms (FFT) and other transforms. For example, wavelet transforms may also be used to generate different representations of the DAS data. Various frequency ranges may be used for different purposes and where low frequency signal changes may be attributed to formation strain changes or fluid movement and other frequency ranges may be indicative of fluid or gas movement. Various filtering techniques may be applied to generate indicators of events related to measuring the flow of fluid.

In some implementations, DAS measurements along the wellbore 1304 may be used as an indication of fluid flow through the casing 1302 in the wellbore 1304. Vibrations and/or acoustic profiles may be recorded and stacked over time, where a simple approach could correlate total energy or recorded signal strength with known flow rates. For example, the fiber optic interrogation unit 1312 may measure energy and/or amplitude in multiple frequency bands where changes in select frequency bands may be associated with oil, water and/or gas thus enabling multiphase production profiling along the wellbore 1304.

As will be appreciated, aspects of the disclosure may be embodied as a system, method or program code/instructions stored in one or more machine-readable media.

Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

None of the implementations described herein may be performed exclusively in the human mind nor exclusively using pencil and paper. None of the implementations described herein may be performed without computerized components such as those described herein. Some implementations may perform additional operations, fewer operations, operations in parallel or in a different order, and some operations differently.

While the aspects of the disclosure are described with reference to various implementations and exploitations, it will be understood that these aspects are illustrative and that the scope of the claims is not limited to them. In general, techniques for determining the corrected boundary information (including uncertainty) for the formation bed boundary of the subsurface formation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

Furthermore, unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

EXAMPLE EMBODIMENTS

Example Embodiments can include the following:

Embodiment #1: A method for monitoring engine oil of a well system, comprising: obtaining engine oil differential pressure (EODP) measurements data from an engine of the well system; determining an EODP oscillation indicator based on the EODP measurement data; and determining at least one of oil level or oil quality based on the EODP oscillation indicator.

Embodiment #2: The method of Embodiment #1, wherein determining at least one of the oil level or the oil quality based on the EODP oscillation indicator includes: determining whether the EODP oscillation indicator is greater than an EODP oscillation threshold; and detecting at least one of a low oil level or a degraded oil quality in response to determining the EODP oscillation indicator is greater than the EODP oscillation threshold.

Embodiment #3: The method of Embodiment #2, wherein detecting at least one of the low oil level or the degraded oil quality in response to determining the EODP oscillation indicator is greater than the EODP oscillation threshold includes: determining whether the EODP oscillation indicator is greater than the EODP oscillation threshold for at least a time period; and detecting the at least one of the low oil level or the degraded oil quality in response to determining the EODP oscillation indicator is greater than the EODP oscillation threshold for at least the time period.

Embodiment #4: The method of Embodiment #2, further comprising: determining at least one of an engine family, an engine fuel type, and a lubricant type associated with the engine of the well system; and determining the EODP oscillation threshold based on the at least one of the engine family, the engine fuel type, and the lubricant type.

Embodiment #5: The method of Embodiment #2, further comprising: generating at least one of a low oil level alert or a degraded oil quality alert for the well system in response to detecting at least one of the low oil level or the degraded oil quality.

Embodiment #6: The method of Embodiment #2, wherein at least one of a drilling operation or a fracturing operation in a wellbore of the well system is modified or halted in response to detecting at least one of the low oil level or the degraded oil quality.

Embodiment #7: The method of Embodiment #2, further comprising: directing at least one of a drilling operation or a fracturing operation in a wellbore of the well system to be modified or halted in response to detecting at least one of the low oil level or the degraded oil quality.

Embodiment #8: The method of Embodiment #1, wherein determining the EODP oscillation indicator based on the EODP measurement data includes performing at least one of data filtering operations, data cleaning operations, adaptive windowing operations, or statistical analysis operations on the EODP measurement data to determine the EODP oscillation indicator.

Embodiment #9: The method of Embodiment #1, further comprising: determining whether the EODP measurement data has an EODP zero value; determining an EODP slope based on the EODP measurement data; and determining at least one of the oil level or the oil quality based on at least one of the EODP oscillation indicator, the EODP zero value, or the EODP slope.

Embodiment #10: The method of Embodiment #9, wherein determining at least one of the oil level or the oil quality based on at least one of the EODP oscillation indicator, the EODP zero value, or the EODP slope includes: determining whether the EODP oscillation indicator is greater than an EODP oscillation threshold; determining whether the EODP measurement data has the EODP zero value; determining whether the EODP slope is greater than an EODP slope threshold; and detecting at least one of a low oil level or a degraded oil quality in response to determining at least one of the EODP oscillation indicator being greater than the EODP oscillation threshold, the EODP measurement data having the EODP zero value, or the EODP slope being greater than the EODP slope threshold.

Embodiment #11: The method of Embodiment #10, wherein: determining whether the EODP oscillation indicator is greater than the EODP oscillation threshold includes determining whether the EODP oscillation indicator is greater than the EODP oscillation threshold for at least a first time period; determining whether the EODP measurement data has the EODP zero value includes determining whether the EODP measurement data has the EODP zero value for at least a second time period; and determining whether the EODP slope is greater than the EODP slope threshold includes determining whether the EODP slope is greater than the EODP slope threshold for at least a third time period.

Embodiment #12: The method of Embodiment #1, further comprising: determining whether the EODP measurement data has an EODP zero value; determining an EODP slope based on the EODP measurement data; determining engine oil pressure (EOP) measurement data for one or more revolutions per minute (RPM) settings; and determining at least one of the oil level or the oil quality based on at least two of the EODP oscillation indicator, the EODP zero value, the EODP slope, and the EOP measurement data.

Embodiment #13: The method of Embodiment #12, wherein determining at least one of the oil level or the oil quality based on at least two of the EODP oscillation indicator, the EODP zero value, the EODP slope, and the EOP and RPM measurement data includes: determining whether the EODP oscillation indicator is greater than an EODP oscillation threshold; determining whether the EODP measurement data has the EODP zero value; determining whether the EODP slope is greater than an EODP slope threshold; determining whether the EOP measurement data is below a minimum EOP threshold; and detecting at least one of a low oil level or a degraded oil quality in response to determining at least two of the EODP oscillation indicator is greater than the EODP oscillation threshold, the EODP measurement data has the EODP zero value, the EODP slope is greater than the EODP slope threshold, and the EOP measurement data is below the minimum EOP threshold.

Embodiment #14: A well system, comprising: one or more processors; and a computer-readable storage medium having instructions stored thereon that are executable by the one or more processors to cause the well system to: obtain engine oil differential pressure (EODP) measurements data from an engine of the well system; determine an EODP oscillation indicator based on the EODP measurement data; and determine at least one of oil level or oil quality based on the EODP oscillation indicator.

Embodiment #15: The well system of Embodiment #14, wherein the instructions that cause the well system to determine at least one of the oil level or the oil quality based on the EODP oscillation indicator include instructions that cause the well system to: determine whether the EODP oscillation indicator is greater than an EODP oscillation threshold; and detect at least one of a low oil level or a degraded oil quality in response to a determination that the EODP oscillation indicator is greater than the EODP oscillation threshold.

Embodiment #16: The well system of Embodiment #15, further comprising instructions that cause the well system to: generate at least one of a low oil level alert or a degraded oil quality alert for the well system in response to a detection of at least one of the low oil level or the degraded oil quality.

Embodiment #17: The well system of Embodiment #14, further comprising instructions that cause the well system to: determine whether the EODP measurement data has an EODP zero value; determine an EODP slope based on the EODP measurement data; determine engine oil pressure (EOP) measurement data for one or more revolutions per minute (RPM) settings; and determine at least one of the oil level or the oil quality based on at least one of the EODP oscillation indicator, the EODP zero value, the EODP slope, and the EOP measurement data.

Embodiment #18: The well system of Embodiment #17, wherein the instructions that cause the well system to determine at least one of the oil level or the oil quality based on at least one of the EODP oscillation indicator, the EODP zero value, the EODP slope, and the EOP and RPM measurement data include instructions that cause the well system to: determine whether the EODP oscillation indicator is greater than an EODP oscillation threshold; determine whether the EODP measurement data has the EODP zero value; determine whether the EODP slope is greater than an EODP slope threshold; determine whether the EOP measurement data is below a minimum EOP threshold; and detect at least one of a low oil level or a degraded oil quality in response to a determination that at least one of the EODP oscillation indicator is greater than the EODP oscillation threshold, the EODP measurement data has the EODP zero value, the EODP slope is greater than the EODP slope threshold, and the EOP measurement data is below the minimum EOP threshold.

Embodiment #19: A non-transitory computer-readable storage medium having instructions stored thereon that are executable by one or more processors of a well system, the instructions comprising: instructions for obtaining engine oil differential pressure (EODP) measurements data from an engine of the well system; instructions for determining an EODP oscillation indicator based on the EODP measurement data; and instructions for determining at least one of oil level or oil quality based on the EODP oscillation indicator.

Embodiment #20: The non-transitory computer-readable storage medium of Embodiment #19, wherein the instructions for determining at least one of the oil level or the oil quality based on the EODP oscillation indicator include: instructions for determining whether the EODP oscillation indicator is greater than an EODP oscillation threshold; and instructions for detecting at least one of a low oil level or a degraded oil quality in response to a determination that the EODP oscillation indicator is greater than the EODP oscillation threshold.

Embodiment #21: The non-transitory computer-readable storage medium of Embodiment #19, further comprising: instructions for determining whether the EODP measurement data has an EODP zero value; instructions for determining an EODP slope based on the EODP measurement data; instructions for determining engine oil pressure (EOP) measurement data for one or more revolutions per minute (RPM) settings; and instructions for determining at least one of the oil level or the oil quality based on at least one of the EODP oscillation indicator, the EODP zero value, the EODP slope, and the EOP measurement data.

Embodiment #22: The non-transitory computer-readable storage medium of Embodiment #21, wherein the instructions for determining at least one of the oil level or the oil quality based on at least one of the EODP oscillation indicator, the EODP zero value, the EODP slope, and the EOP and RPM measurement data include: instructions for determining whether the EODP oscillation indicator is greater than an EODP oscillation threshold; instructions for determining whether the EODP measurement data has the EODP zero value; instructions for determining whether the EODP slope is greater than an EODP slope threshold; instructions for determining whether the EOP measurement data is below a minimum EOP threshold; and instructions for detecting at least one of a low oil level or a degraded oil quality in response to a determination that at least one of the EODP oscillation indicator is greater than the EODP oscillation threshold, the EODP measurement data has the EODP zero value, the EODP slope is greater than the EODP slope threshold, and the EOP measurement data is below the minimum EOP threshold.

What is claimed is:

1. A method for monitoring engine oil of a well system, comprising:

obtaining, by a computer system, engine oil differential pressure (EODP) measurement data from one or more pressure sensors of an engine of the well system;

determining, by the computer system, an EODP oscillation indicator based on statistical EODP values derived from the EODP measurement data; and determining, by the computer system, at least one of an oil level or an oil quality based on the EODP oscillation indicator and an EODP oscillation threshold.

2. The method of claim 1, wherein determining at least one of the oil level or the oil quality based on the EODP oscillation indicator and the EODP oscillation threshold includes:

determining whether the EODP oscillation indicator is greater than the EODP oscillation threshold; and detecting at least one of a low oil level or a degraded oil quality in response to determining the EODP oscillation indicator is greater than the EODP oscillation threshold.

3. The method of claim 1, wherein determining the EODP oscillation indicator based on statistical EODP values derived from the EODP measurement data includes:

deriving statistical EODP values including a first statistical EODP value and a second statistical EODP value from the EODP measurement data; and determining the EODP oscillation indicator based on a difference between the first statistical EODP value and the second statistical EODP value.

4. The method of claim 1, further comprising:

determining at least one of an engine family, an engine fuel type, and a lubricant type associated with the engine of the well system; and determining the EODP oscillation threshold based on the at least one of the engine family, the engine fuel type, and the lubricant type.

5. The method of claim 2, further comprising:

generating at least one of a low oil level alert or a degraded oil quality alert for the well system in response to detecting at least one of the low oil level or the degraded oil quality.

6. The method of claim 2, wherein at least one of a drilling operation or a fracturing operation in a wellbore of the well system is modified or halted in response to detecting at least one of the low oil level or the degraded oil quality.

7. The method of claim 2, further comprising:

directing at least one of a drilling operation or a fracturing operation in a wellbore of the well system to be modified or halted in response to detecting at least one of the low oil level or the degraded oil quality.

8. The method of claim 1, wherein determining the EODP oscillation indicator based on statistical EODP values derived from the EODP measurement data further includes performing at least one of data filtering operations, data cleaning operations, or adaptive windowing operations, or statistical analysis operations on the EODP measurement data to determine the EODP oscillation indicator.

9. The method of claim 1, further comprising:
- determining whether the EODP measurement data has an EODP zero value;
- determining an EODP slope based on the EODP measurement data; and
- determining at least one of the oil level or the oil quality based on at least one of the EODP oscillation indicator, the EODP zero value, or the EODP slope.

10. The method of claim 9, wherein determining at least one of the oil level or the oil quality based on at least one of the EODP oscillation indicator, the EODP zero value, or the EODP slope includes:
- determining whether the EODP oscillation indicator is greater than an EODP oscillation threshold;
- determining whether the EODP measurement data has the EODP zero value;
- determining whether the EODP slope is greater than an EODP slope threshold; and
- detecting at least one of a low oil level or a degraded oil quality in response to determining at least one of the EODP oscillation indicator being greater than the EODP oscillation threshold, the EODP measurement data having the EODP zero value, or the EODP slope being greater than the EODP slope threshold.

11. The method of claim 10, wherein:
- determining whether the EODP oscillation indicator is greater than the EODP oscillation threshold includes determining whether the EODP oscillation indicator is greater than the EODP oscillation threshold for at least a first time period;
- determining whether the EODP measurement data has the EODP zero value includes determining whether the EODP measurement data has the EODP zero value for at least a second time period; and
- determining whether the EODP slope is greater than the EODP slope threshold includes determining whether the EODP slope is greater than the EODP slope threshold for at least a third time period.

12. The method of claim 1, further comprising:
- determining whether the EODP measurement data has an EODP zero value;
- determining an EODP slope based on the EODP measurement data;
- determining engine oil pressure (EOP) measurement data for one or more revolutions per minute (RPM) settings; and
- determining at least one of the oil level or the oil quality based on at least two of the EODP oscillation indicator, the EODP zero value, the EODP slope, and the EOP measurement data.

13. The method of claim 12, wherein determining at least one of the oil level or the oil quality based on at least two of the EODP oscillation indicator, the EODP zero value, the EODP slope, and the EOP and RPM measurement data includes:
- determining whether the EODP oscillation indicator is greater than an EODP oscillation threshold;
- determining whether the EODP measurement data has the EODP zero value;
- determining whether the EODP slope is greater than an EODP slope threshold;
- determining whether the EOP measurement data is below a minimum EOP threshold; and
- detecting at least one of a low oil level or a degraded oil quality in response to determining at least two of the EODP oscillation indicator is greater than the EODP oscillation threshold, the EODP measurement data has the EODP zero value, the EODP slope is greater than the EODP slope threshold, and the EOP measurement data is below the minimum EOP threshold.

14. The method of claim 1, further comprising:
- determining an EODP slope based on the EODP measurement data; and
- determining at least one of the oil level or the oil quality based on at least one of the EODP oscillation indicator or the EODP slope.

15. The method of claim 1, further comprising:
- determining whether the EODP measurement data has an EODP zero value; and
- determining at least one of the oil level or the oil quality based on at least one of the EODP oscillation indicator or the EODP zero value.

16. A well system, comprising:
- one or more processors; and
- a computer-readable storage medium having instructions stored thereon that are executable by the one or more processors to cause the well system to:
  - obtain engine oil differential pressure (EODP) measurement data from one or more pressure sensors of an engine of the well system;
  - determine an EODP oscillation indicator based on statistical EODP values derived from the EODP measurement data; and
  - determine at least one of an oil level or an oil quality based on the EODP oscillation indicator and an EODP oscillation threshold.

17. The well system of claim 16, wherein the instructions that cause the well system to determine at least one of the oil level or the oil quality based on the EODP oscillation indicator and the EODP oscillation threshold include instructions that cause the well system to:
- determine whether the EODP oscillation indicator is greater than an EODP oscillation threshold; and
- detect at least one of a low oil level or a degraded oil quality in response to a determination that the EODP oscillation indicator is greater than the EODP oscillation threshold.

18. The well system of claim 17, further comprising instructions that cause the well system to:
- generate at least one of a low oil level alert or a degraded oil quality alert for the well system in response to a detection of at least one of the low oil level or the degraded oil quality.

19. The well system of claim 16, further comprising instructions that cause the well system to:
- determine whether the EODP measurement data has an EODP zero value;
- determine an EODP slope based on the EODP measurement data;
- determine engine oil pressure (EOP) measurement data for one or more revolutions per minute (RPM) settings; and
- determine at least one of the oil level or the oil quality based on at least one of the EODP oscillation indicator, the EODP zero value, the EODP slope, and the EOP measurement data.

20. The well system of claim 19, wherein the instructions that cause the well system to determine at least one of the oil level or the oil quality based on at least one of the EODP oscillation indicator, the EODP zero value, the EODP slope, and the EOP and RPM measurement data include instructions that cause the well system to:

determine whether the EODP oscillation indicator is greater than an EODP oscillation threshold;

determine whether the EODP measurement data has the EODP zero value;

determine whether the EODP slope is greater than an EODP slope threshold;

determine whether the EOP measurement data is below a minimum EOP threshold; and detect at least one of a low oil level or a degraded oil quality in response to a determination that at least one of the EODP oscillation indicator is greater than the EODP oscillation threshold, the EODP measurement data has the EODP zero value, the EODP slope is greater than the EODP slope threshold, and the EOP measurement data is below the minimum EOP threshold.

21. A non-transitory computer-readable storage medium having instructions stored thereon that are executable by one or more processors of a well system, the instructions comprising:

instructions for obtaining engine oil differential pressure (EODP) measurement data from one or more pressure sensors of an engine of the well system;

instructions for determining an EODP oscillation indicator based on statistical EODP values derived from the EODP measurement data; and instructions for determining at least one of an oil level or an oil quality based on the EODP oscillation indicator and an EODP oscillation threshold.

22. The non-transitory computer-readable storage medium of claim 21, wherein the instructions for determining at least one of the oil level or the oil quality based on the EODP oscillation indicator and the EODP oscillation threshold include:

instructions for determining whether the EODP oscillation indicator is greater than an EODP oscillation threshold; and instructions for detecting at least one of a low oil level or a degraded oil quality in response to a determination that the EODP oscillation indicator is greater than the EODP oscillation threshold.

23. The non-transitory computer-readable storage medium of claim 21, further comprising:

instructions for determining whether the EODP measurement data has an EODP zero value;

instructions for determining an EODP slope based on the EODP measurement data;

instructions for determining engine oil pressure (EOP) measurement data for one or more revolutions per minute (RPM) settings; and instructions for determining at least one of the oil level or the oil quality based on at least one of the EODP oscillation indicator, the EODP zero value, the EODP slope, and the EOP measurement data.

24. The non-transitory computer-readable storage medium of claim 23, wherein the instructions for determining at least one of the oil level or the oil quality based on at least one of the EODP oscillation indicator, the EODP zero value, the EODP slope, and the EOP and RPM measurement data include:

instructions for determining whether the EODP oscillation indicator is greater than an EODP oscillation threshold;

instructions for determining whether the EODP measurement data has the EODP zero value;

instructions for determining whether the EODP slope is greater than an EODP slope threshold;

instructions for determining whether the EOP measurement data is below a minimum EOP threshold; and instructions for detecting at least one of a low oil level or a degraded oil quality in response to a determination that at least one of the EODP oscillation indicator is greater than the EODP oscillation threshold, the EODP measurement data has the EODP zero value, the EODP slope is greater than the EODP slope threshold, and the EOP measurement data is below the minimum EOP threshold.

* * * * *